(12) United States Patent
Shin et al.

(10) Patent No.: US 12,474,843 B2
(45) Date of Patent: Nov. 18, 2025

(54) DETERMINING EXPOSURE TEMPERATURES

(71) Applicant: SAMSUNG ELECTRONICS CO., LTD., Suwon-si (KR)

(72) Inventors: Seohyun Shin, Suwon-si (KR); Kyungduk Lee, Suwon-si (KR); Sanghwa Jin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/600,370

(22) Filed: Mar. 8, 2024

(65) Prior Publication Data

US 2025/0036288 A1    Jan. 30, 2025

(30) Foreign Application Priority Data

Jul. 26, 2023   (KR) .................. 10-2023-0097269

(51) Int. Cl.
*G06F 3/06*  (2006.01)

(52) U.S. Cl.
CPC .......... *G06F 3/0616* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,644,099 B2 | 2/2014 | Cometti et al. |
| 9,165,668 B1 | 10/2015 | Zhao et al. |
| 9,280,419 B2 | 3/2016 | Chunn et al. |
| 2015/0092488 A1 | 4/2015 | Wakchaure et al. |
| 2015/0169398 A1* | 6/2015 | Chunn ................ G06F 11/3034 714/763 |

(Continued)

FOREIGN PATENT DOCUMENTS

| | | |
|---|---|---|
| JP | 2014-038430 | 2/2014 |
| JP | 2020-022111 | 2/2020 |

OTHER PUBLICATIONS

Extended European Search Report in European Appln. No. 24160544.3, mailed on Aug. 1, 2024, 9 pages.

*Primary Examiner* — Kevin Verbrugge
(74) *Attorney, Agent, or Firm* — Fish & Richardson P.C.

(57) ABSTRACT

A method of providing an exposure temperature includes generating reference information indicating relationships between an exposure condition and a retention value, where the exposure condition include an exposure temperature and an exposure time of a nonvolatile memory device and the retention value indicates retention characteristic of the nonvolatile memory device, before a power-off time point when the nonvolatile memory device is powered-off, performing a monitoring program operation to write monitoring data in target memory cells included in the nonvolatile memory device, after a power-on time point when the nonvolatile memory device is powered on, generating a measured retention value by performing a monitoring read operation to read data from the target memory cells, and estimating, based on the reference information, a measured exposure temperature corresponding to the measured retention value and a measured exposure time between the power-off time point and the power-on time point.

20 Claims, 30 Drawing Sheets

(56) References Cited

U.S. PATENT DOCUMENTS

| | | | |
|---|---|---|---|
| 2016/0054937 A1* | 2/2016 | Tuers | G11C 7/04 |
| | | | 711/103 |
| 2017/0131924 A1* | 5/2017 | Main | G06F 11/3034 |
| 2022/0188177 A1 | 6/2022 | Lee et al. | |
| 2022/0206821 A1* | 6/2022 | Devegowda | G06F 9/4401 |
| 2023/0056133 A1 | 2/2023 | van Duuren et al. | |
| 2023/0062129 A1* | 3/2023 | Heath | G06F 3/0659 |
| 2023/0066851 A1* | 3/2023 | Heath | G06F 3/0653 |
| 2023/0297471 A1* | 9/2023 | Hong | G11C 29/50016 |
| | | | 714/42 |
| 2023/0315312 A1* | 10/2023 | Takahashi | G11C 16/32 |
| | | | 711/154 |

* cited by examiner

FIG. 4

|  | S1 | S2 | S3 | S4 | S5 | S6 | S7 | S8 |
|---|---|---|---|---|---|---|---|---|
| LSB | 1 | 0 | 0 | 0 | 0 | 1 | 1 | 1 |
| CSB | 1 | 1 | 0 | 0 | 1 | 1 | 0 | 0 |
| MSB | 1 | 1 | 1 | 0 | 0 | 0 | 0 | 1 |

VR1 VR2 VR3 VR4 VR5 VR6 VR7

SBM

| | EPC | | | | | RTV | | |
|---|---|---|---|---|---|---|---|---|
| | 10°C | 30°C | 50°C | 70°C | 100°C | dCNT | CNT | NEB |
| $ET_p$ | 0 | 0 | 0 | 0 | 0 | P0 | Q0 | R0 |
| $ET_m$ | A | B | C | D | E | P1 | Q1 | R1 |
| | 2A | 2B | 2C | 2D | 2E | P2 | Q2 | R2 |

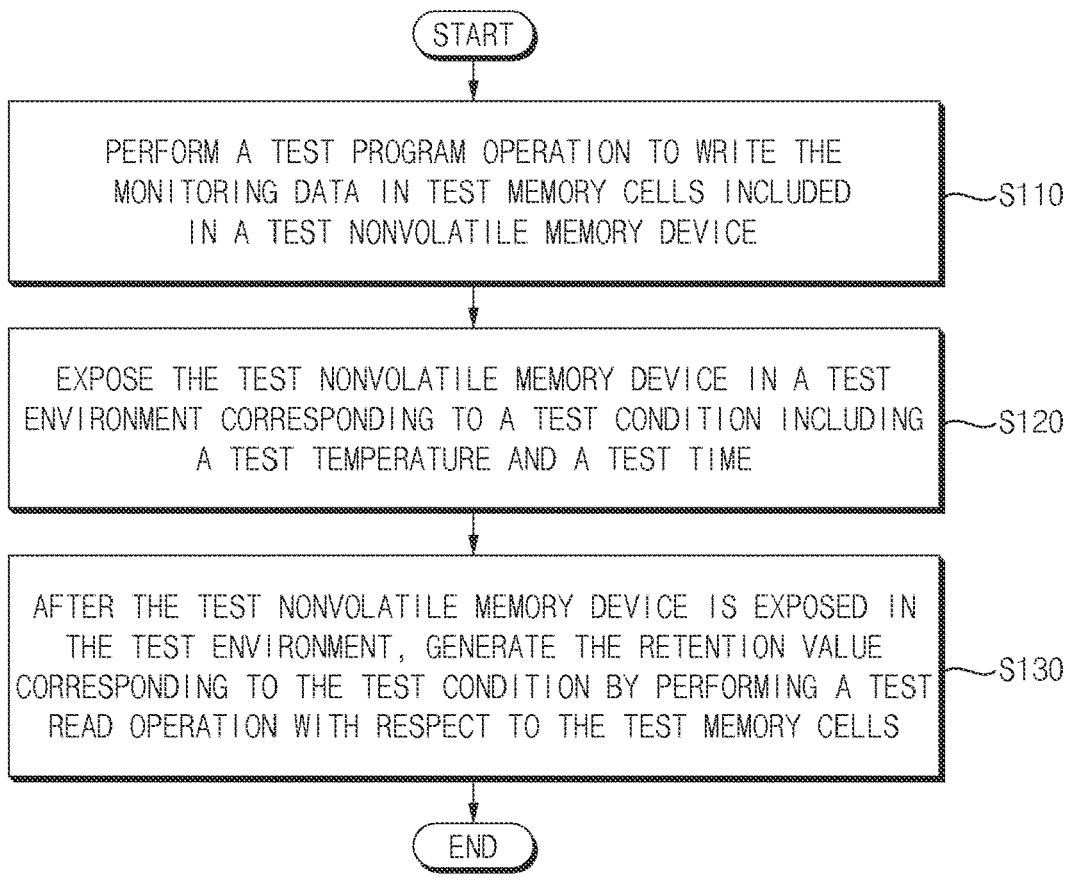

FIG. 25

| INPUT DATA(X) | OUTPUT DATA(Y) |
|---|---|
| $ET_m$ | $ET_p$ |
| VL | RB |
| P/E | |
| EPI | |
| Ton | |
| Toff | |
| UT | |

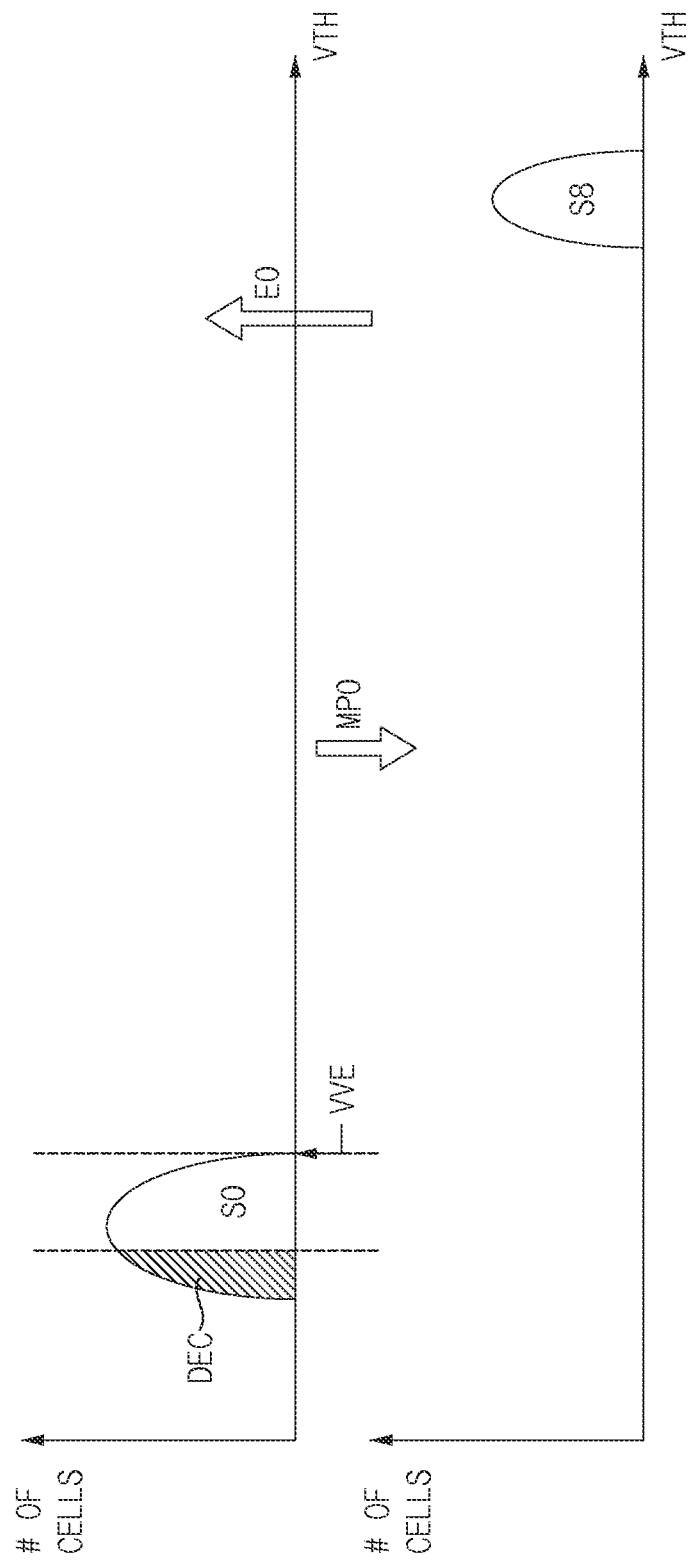

DETERMINING EXPOSURE TEMPERATURES

CROSS-REFERENCE TO RELATED APPLICATION

This U.S. non-provisional application claims priority under 35 USC § 119 to Korean Patent Application No. 10-2023-0097269, filed on Jul. 26, 2023, in the Korean Intellectual Property Office (KIPO), the disclosure of which is incorporated by reference herein in its entirety.

TECHNICAL FIELD

Aspects of this disclosure relate to semiconductor integrated circuits, and in some implementations to storage devices and methods of providing an exposure temperature of a nonvolatile memory device in a power-off state.

BACKGROUND

Battery performance and lifespan management are some of the most important issues in products such as autonomous electric vehicles, and a battery management system (BMS) is used to efficiently manage these issues. Problems with electric vehicle batteries include fire due to excessive heat emission, reduced ability to maintain charge (overcharging, cycling, aging, etc.), and deterioration of battery performance due to deterioration caused by hot weather and frequent charging and discharging.

To address these issues, manufacturers use thermal management systems to keep the battery cool and use BMS to optimize charging and discharging of the battery, providing a way to extend its lifespan. Additionally, many electric vehicle manufacturers offer warranties that cover battery performance degradation.

Heat detection and management are very important issues in such products, and in the power-on state, operating temperature is detected through a temperature sensor, temperature information is provided to the necessary system, and the temperature information is used to perform control operations.

SUMMARY

Some implementations provide storage devices and methods for efficiently providing an exposure temperature of a nonvolatile memory device in a power-off state.

According to some implementations, a method of providing an exposure temperature of a nonvolatile memory device in a power-off state, includes, generating reference information indicating relationships between an exposure condition and a retention value, where the exposure condition include an exposure temperature and an exposure time of a nonvolatile memory device and the retention value indicates retention characteristic of the nonvolatile memory device, before a power-off time point when the nonvolatile memory device is powered-off, performing a monitoring program operation to write monitoring data in target memory cells included in the nonvolatile memory device, after a power-on time point when the nonvolatile memory device is powered on, generating a measured retention value by performing a monitoring read operation to read data from the target memory cells, and estimating, based on the reference information, a measured exposure temperature corresponding to the measured retention value and a measured exposure time between the power-off time point and the power-on time point.

According to some implementations, a storage device includes a storage device includes a nonvolatile memory device and a storage controller. The nonvolatile memory device is configured to store reference information indicating relationships between an exposure condition and a retention value, where the exposure condition includes an exposure temperature and an exposure time of the nonvolatile memory device and the retention value indicates retention characteristic of the nonvolatile memory device. The storage controller is configured to control the nonvolatile memory device, before a power-off time point when the nonvolatile memory device is powered-off, performing a monitoring program operation to write monitoring data in target memory cells included in the nonvolatile memory device, after a power-on time point when the nonvolatile memory device is powered on, generating a measured retention value by performing a monitoring read operation to read data from the target memory cells, and estimating, based on the reference information, a measured exposure temperature corresponding to the measured retention value and a measured exposure time between the power-off time point and the power-on time point.

According to some implementations, a method of providing an exposure temperature of a nonvolatile memory device in a power-off state, includes, performing a test program operation to write monitoring data in test memory cells included in a test nonvolatile memory device, exposing the test nonvolatile memory device in a test environment corresponding to a test condition including a test temperature and a test time, after the test nonvolatile memory device is exposed in the test environment, generating a retention value corresponding to the test condition by performing a test read operation with respect to the test memory cells, generating reference information indicating relationships between the exposure condition, the retention value and the exposure temperature, before a power-off time point when a nonvolatile memory device is powered-off, performing a monitoring program operation to write monitoring data in target memory cells included in the nonvolatile memory device, after a power-on time point when the nonvolatile memory device is powered on, generating a measured retention value by performing a monitoring read operation to read data from the target memory cells, the measured retention value corresponding to at least one of a number of the target memory cells having threshold voltages higher than a monitoring voltage, a number of the target memory cells having threshold voltages between a first monitoring voltage and a second monitoring voltage and an error bit number of data read from the target memory cells, and estimating, based on the reference information, a measured exposure temperature corresponding to the measured retention value and a measured exposure time between the power-off time point and the power-on time point.

The storage device and the method of providing an exposure temperature according to some implementations may reduce the power consumption and enhance the performance of the battery by providing the exposure information in the power-off state using the retention characteristic of the nonvolatile memory device without supplying power to circuits for temperature monitoring in the power-off state. By using the exposure temperature in the power-off state, products containing temperature-vulnerable components may be efficiently managed and controlled.

BRIEF DESCRIPTION OF THE DRAWINGS

Some implementations of the present disclosure will be more clearly understood from the following detailed description taken in conjunction with the accompanying drawings.

FIG. 4 is a diagram illustrating an example of state-bit mapping information indicating mapping relationship between states in FIG. 3 and bit values.

FIG. 18 is a flowchart illustrating an example of generating reference information in a method of providing an exposure temperature of a nonvolatile memory device in a power-off state according to some implementations.

FIG. 19 is a diagram illustrating an example of reference information in a method of providing an exposure temperature of a nonvolatile memory device in a power-off state according to some implementations.

FIG. 25 is a diagram illustrating data in a method of providing an exposure temperature of a nonvolatile memory device in a power-off state according to some implementations.

DETAILED DESCRIPTION

Figure 1:
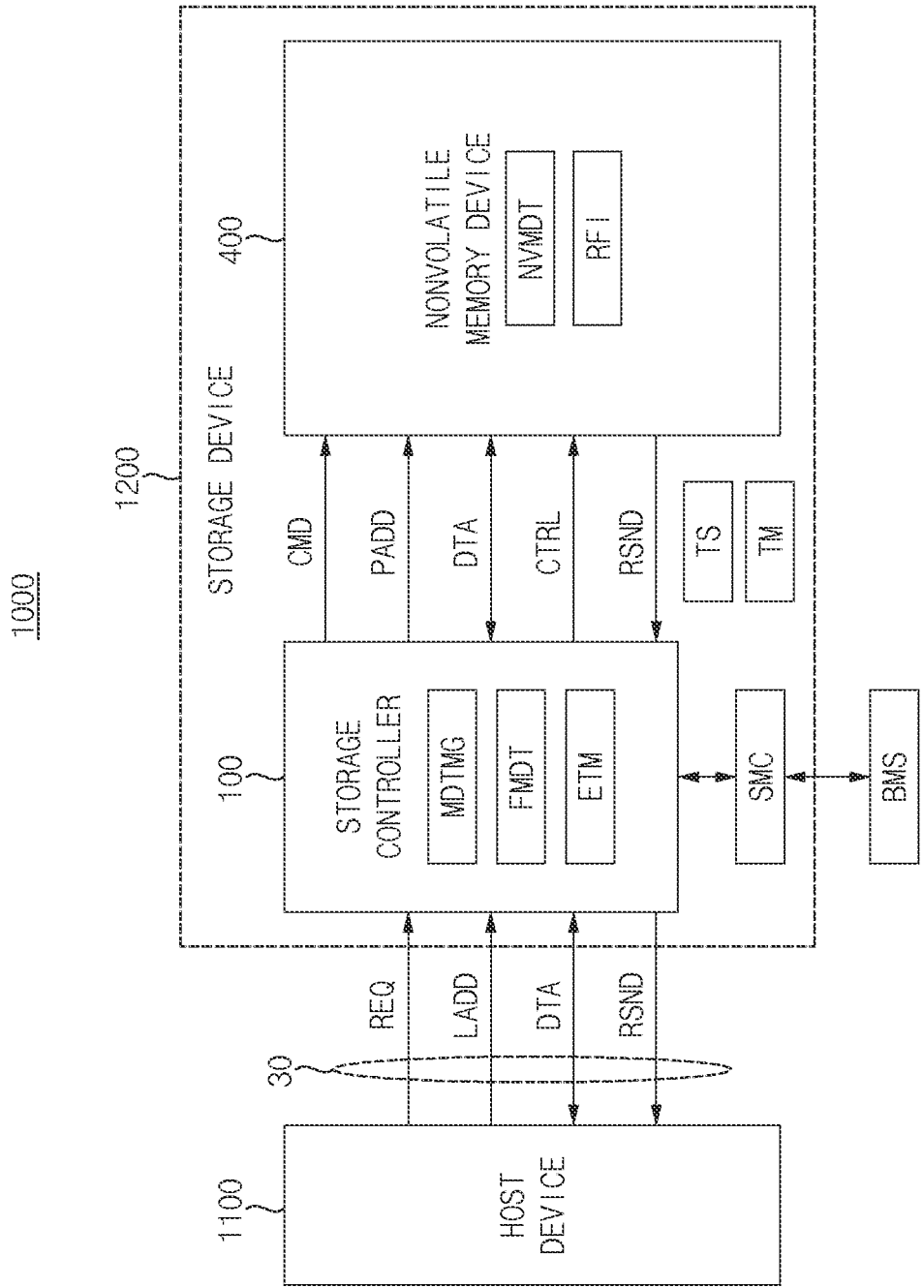
FIG. 1 is a block diagram illustrating a storage system according to some implementations.

Various implementations will be described more fully hereinafter with reference to the accompanying drawings, in which some implementations are shown. In the drawings, like numerals refer to like elements throughout. Repeated descriptions may be omitted.

For purposes of this disclosure, it has been recognized that, to accurately predict and manage battery remaining capacity, performance, and lifespan, temperature information in a power-off state (as opposed to only a power-on state) can be useful. The systems and processes described herein facilitate determination of the temperature in a power-off state FIG. 1 is a block diagram illustrating a storage system according to some implementations, and FIG. 2 is a flowchart illustrating a method of providing an exposure temperature of a nonvolatile memory device in a power-off state (e.g., a temperature to which the nonvolatile memory device has been exposed while powered off) according to some implementations.

Figure 2:
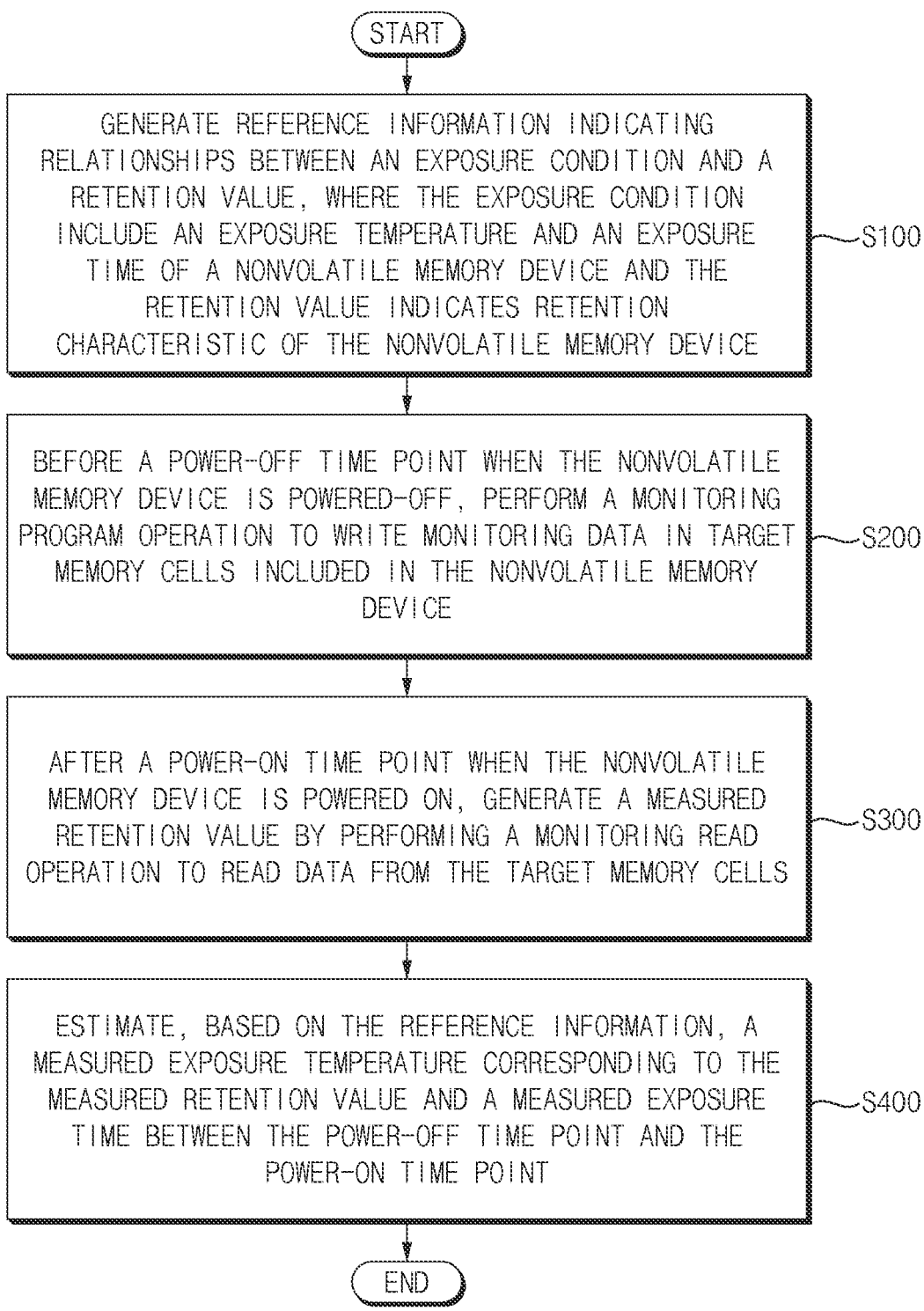
FIG. 2 is a flowchart illustrating a method of providing an exposure temperature of a nonvolatile memory device in a power-off state according to some implementations.

Referring to FIG. 1, a storage system 1000 includes a host device 1100, a storage device 1200, and a link 30 connecting the host device 1100 and the storage device 1200. The storage device 1200 may include a storage controller 100 and a nonvolatile memory device 400. For example, the storage device 1200 may be a solid state drive (SSD), an embedded multimedia card (eMMC), or a universal flash storage (UFS) device. In some implementations, the link 30 may be a PCIe link. According to some implementations, the storage device 1200 may further include a temperature sensor (TS), a timer (TM), etc. The temperature sensor TS may provide an operating temperature in a power-on state and may be disabled to save power consumption in a power-off state. The timer TM may provide time information (e.g., a time stamp) corresponding to a power-off time point and a power-on time point to calculate an exposure time, as will be described below.

The host device 1100 may be a data processing device capable of processing data, such as a central processing unit (CPU), a processor, a microprocessor, an application processor, etc. The storage device 1200 may be embedded in an electronic device together with the host device 1100, and may be electrically connected to the electronic device including the host device 1100 in a detachable manner.

The host device 1100 may transmit a data operation request REQ, that is, a request and a logical address LADD, to the storage controller 100, and may exchange data DTA with the storage controller 100. The storage controller 100 may transmit a response RSND responding to the data operation request REQ to the host device 1100. The data operation request REQ may include a data read request, a data write request, and a data erase request.

The storage controller 100 may control the nonvolatile memory device 400 in response to the request REQ from the host device 1100. The read and write operations may be performed with respect to the nonvolatile memory device 400 by providing the nonvolatile memory device 400 with a physical address PADD mapped to a logical address LADD, a command CMD, and a control signal CTRL. The write operation may be referred to as a program operation. For example, the storage controller 100 may perform a flash translation layer FTL operation to convert the logical address LADD transmitted from the host device 1100 into the physical address PADD.

The storage controller 100 may control the nonvolatile memory device 400 to read data DTA stored in the nonvolatile memory device 400 in response to the read request received from the host device 1100. The storage controller 100 may control the nonvolatile memory device 400 to write or program data DTA in the nonvolatile memory device 400 in response to the write or program request received from the host device 1100. The storage controller 100 may control the nonvolatile memory device 400 to erase data stored in the nonvolatile memory device 400 in response to the erase request received from the host device 1100. The nonvolatile memory device 400 may transfer a response RSND to the storage controller 100 in response to the command CMD.

The nonvolatile memory device 400 may be implemented with nonvolatile memory such as flash memory, MRAM (Magnetic RAM), FeRAM (Ferroelectric RAM), PRAM (Phase change RAM), ReRAM (Resistive RAM), or the like. The nonvolatile memory device 400 may be connected to the storage controller 100 through a plurality of channels. Hereinafter, some implementations will be described based on NAND flash memory, but implementations are not limited to any particular kind of nonvolatile memory.

The storage controller 100 may include a metadata manager MDTMG that monitors metadata errors. The metadata is distinguished from user data stored in the nonvolatile memory device 400 at the request of the host device 1100, and the metadata is generated and managed by firmware of the storage controller 100 to manage the user data or the nonvolatile memory device 400. The metadata may include a mapping table indicating a mapping relationship between the logical address of the host device 1100 and the physical address of the nonvolatile memory 400, and may include other information such as bad blocks, program-erase cycles, valid page count values for managing the memory space of the nonvolatile memory device 400, and/or the like.

The metadata may be loaded from the nonvolatile memory device 400 when the storage system 1000 is powered on and stored in the memory, for example, volatile memory such as DRAM or SRAM of the storage controller 100. The metadata stored in the nonvolatile memory device 400 may be referred to as nonvolatile metadata NVMDT, and the metadata stored in the storage controller 100 may be referred to as firmware metadata FMDT. The firmware metadata FMDT may be changed during operations of the storage device 1200, and a journaling technique may be used to maintain consistency of the firmware metadata FMDT and the nonvolatile metadata NVMDT.

During the power-on process of the storage device 1200, the metadata manager 200 may generate the firmware metadata FMDT based on the nonvolatile metadata NVMDT stored in the nonvolatile memory device 400. Additionally, during the power-off process, the metadata manager 200 may perform a metadata backup operation to store the firmware metadata FMDT of the volatile memory device to the nonvolatile memory device 400.

Additionally, the storage controller 100 may include an exposure temperature monitor ETM that provides an exposure temperature of the nonvolatile memory device 400 in the power-off state. In some implementations, the storage controller 100 may further include a satellite management controller SMC that performs communication with peripheral devices. The exposure temperature monitor ETM may use the peripheral management controller SMC to provide the estimated exposure temperature to a peripheral device such as a battery management system BMS. Additionally, the exposure temperature monitor ETM may provide the estimated exposure temperature or the measured exposure temperature to the host device 1100 through the link 30.

Referring to FIGS. 1 and 2, reference information RFI indicating relationships between an exposure condition and a retention value may be generated, where the exposure condition include an exposure temperature and an exposure time of the nonvolatile memory device 400 and the retention value indicates retention characteristic of the nonvolatile memory device 400 (S100). The nonvolatile memory devices manufactured in the same manufacturing process may be considered to have identical characteristics. Accordingly, the reference information RFI may be generated during testing before and/or after nonvolatile memory devices are integrated into a storage device. The generated reference information RFI may be stored in each nonvolatile memory device and used to estimate exposure temperature in the power-off state. Some implementations of generating the reference information RFI will be described below with reference to FIGS. 18 through 25.

Before a power-off time point when the nonvolatile memory device 400 is powered-off, the exposure temperature monitor ETM may perform a monitoring program operation to write monitoring data in target memory cells included in the nonvolatile memory device 400 (S200). The monitoring data may have an appropriate data pattern to promote deterioration of the retention characteristic according to the exposure temperature. Some implementations of the monitoring data will be described below with reference to FIGS. 28 through 30B.

After a power-on time point when the nonvolatile memory device 400 is powered on, the exposure temperature monitor ETM may generate a measured retention value by performing a monitoring read operation to read data from the target memory cells (S300). The measured retention value may be set to an appropriate value that may reflect the deterioration of the retention characteristic according to the exposure temperature, and the operating condition of the monitoring read operation may be determined to correspond to the set measured retention value. Some implementations of the measured retention value will be described below with reference to FIGS. 12A through 17.

Based on the reference information RFI, the exposure temperature monitor ETM may estimate a measured exposure temperature corresponding to the measured retention value and a measured exposure time between the power-off time point and the power-on time point (S400). Semiconductor products produced during mass production have substantially the same characteristics. Therefore, even if the reference information RFI is generated using a test nonvolatile memory device different from the nonvolatile memory device 400, the exposure temperature very close to the actual exposure temperature may be estimated using the reference information RFI. According to some implementations, before the reference information RFI is provided to the storage device 1200, the reference information RFI may be calibrated to reflect the operation deviation of each nonvolatile memory device.

As such, the method of providing the exposure temperature and the storage device 1200 according to some implementations may reduce the power consumption and enhance the performance of the battery by providing the exposure information in the power-off state using the retention characteristic of the nonvolatile memory device without requiring a supply of power to circuits for temperature monitoring in the power-off state. By using the exposure temperature in the power-off state, products containing temperature-vulnerable components may be efficiently managed and controlled.

Hereinafter, a NAND flash memory device used in a method of providing an exposure temperature of a nonvolatile memory device in a power-off state according to some implementations will be described with reference to FIGS. 3 through 11. Some implementations are not limited to the NAND flash memory devices, and may be applied to any nonvolatile memory device, which retains the stored data even in the power-off state and in which the data retention characteristics deteriorate differently depending on the exposure temperature.

Figure 3:
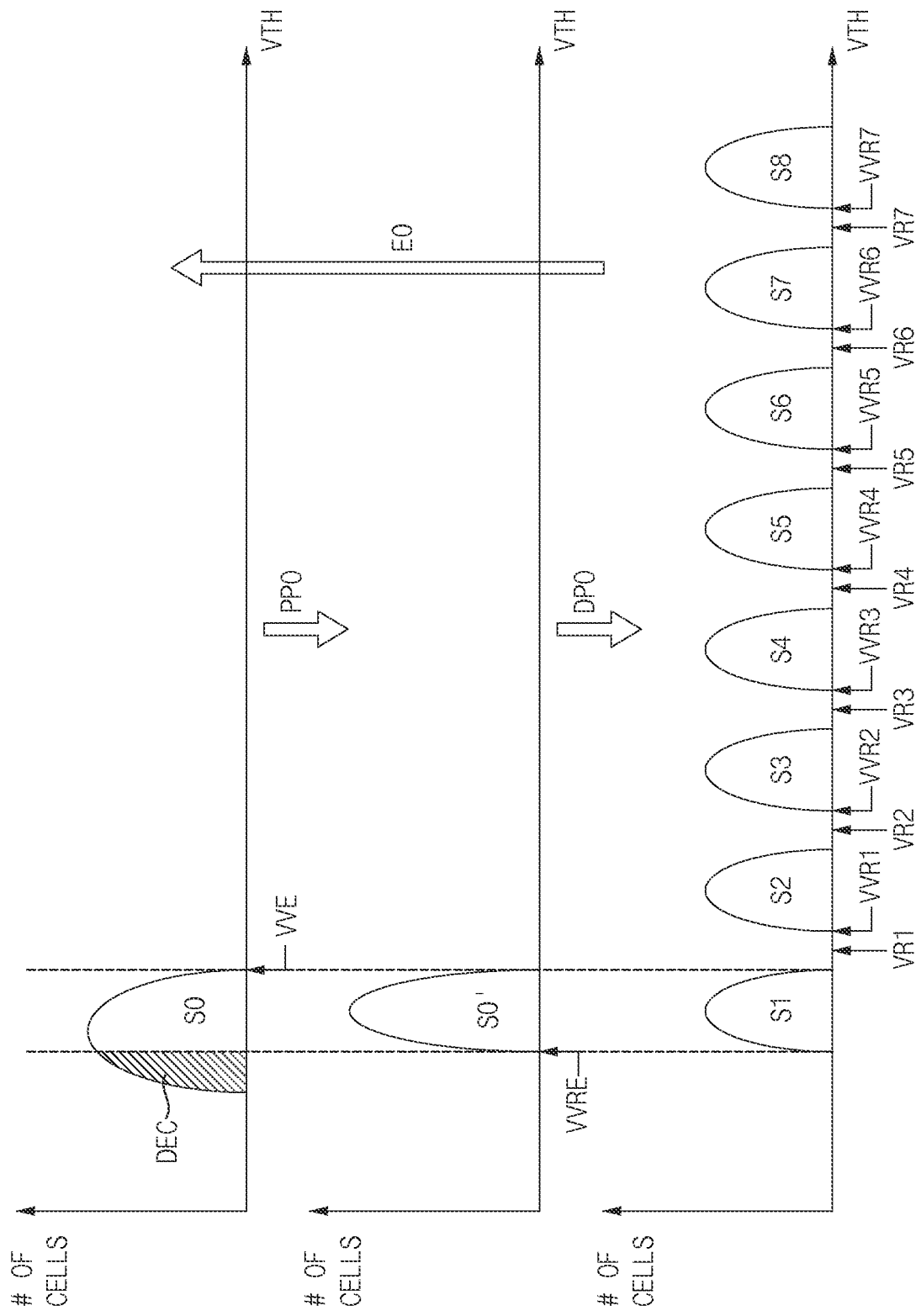
FIG. 3 is a diagram illustrating state change of memory cells in a nonvolatile memory device according to some implementations.

FIG. 3 is a diagram illustrating state changes of memory cells in a nonvolatile memory device according to some implementations.

In FIG. 3, a horizontal axis represents a threshold voltage VTH of memory cells, and a vertical axis represents the number of memory cells corresponding to the threshold voltage VTH. Although FIG. 3 shows a triple level cell (TLC) scheme in which each memory cell stores a 3-bit value, some implementations are not limited thereto, and the number of bits stored in each selected memory cell may be determined variously. In other words, the method of providing the exposure temperature according to some implementations may be performed using nonvolatile memory devices adopting not only the TLC scheme shown in FIG. 3, but also a single level cell (SLC) scheme in which each memory cell stores a 1-bit value, a multi-level cell (MLC) scheme in which each memory cell stores a 2-bvalue, a quadruple level cell (QLC) scheme in which each memory cell stores a 4-bit value, a penta level cell (PLC) scheme in which each memory cell stores a 5-bit value, or a combination thereof.

Referring to FIG. 3, selected memory cells may be erased by an erase operation EO to have threshold voltages lower than an erase verify voltage VVE. Here, some memory cells among the selected memory cells may be excessively erased and have too low threshold voltages, and these memory cells may be referred to as over-erased memory cells DEC.

The threshold voltages of the over-erased memory cells DEC may be increased higher than the pre-verification read voltage VVRE by the preprogram operation PPO. As a result, as shown in FIG. 3, the erased state S0' after the preprogram operation PPO may have a narrower threshold voltage range than the erased state S0 before the preprogram operation PPO.

After that, a data program operation DPO may be performed such that each selected memory cell corresponds to one state depending on the write data among the first through eighth states S1~S8. Here, the first state S1 corresponds to an unprogrammed erased state. During the data program operation DPO, the program execution results for the first through eighth states S1~S8 may be determined by sequentially applying the first through seventh data verification read voltages VVR1~VVR7 to the selected wordline. Also, during the read operation, each bit of the first through eighth states S1~S8 may be determined by sequentially applying some of the normal read voltages VR1~VR7 to the selected wordline.

FIG. 4 is a diagram illustrating an example of state-bit mapping information indicating mapping relationship between states in FIG. 3 and bit values.

Referring to FIG. 4, state-bit mapping information SBM may indicate the mapping relationships between the states and the bits stored in the plurality of multi-level cells. FIG. 4 illustrates an example of bit values corresponding to the first through eighth states S1~S8 in FIG. 3. The first through eighth states S1~S8 may be represented by different values corresponding to least significant bit (LSB), a centered bit (CSB) and a most significant bit (MSB), for example, different values of first, second and third bits LSB, CSB and MSB. For example, as illustrated in FIG. 4 and in order of MBS, CSB, LSB, the first state S1 corresponds to '111', the second state S2 corresponds to '110', the third state S3 corresponds to '100', the fourth state S4 corresponds to '000', the fifth S5 state corresponds to '010', the sixth S6 state corresponds to '011', the seventh state S7 corresponds to '001', and the eighth state S8 corresponds to '101'.

In this case, the first bit LSB may be determined using the first read voltage VR1 and the fifth read voltage VR5, the second bit CSB may be determined using the second read voltage VR2, the fourth read voltage VR4 and the sixth read voltage VR6, and the third bit MSB may be determined using the third read voltage VR3 and the seventh read voltage VR7.

In the over-erased state, holes accumulate in the charge storage layer of the memory cell, and these holes, due to the over-erase effect, spread to the surrounding area over time. The diffused holes combine with electrons stored in the programmed memory cell and distort the threshold voltage distribution of the programmed memory cell. As a result, as the number of over-erased memory cells increases after the write operation is completed, the retention characteristic of the nonvolatile memory device may deteriorate.

Figure 5:
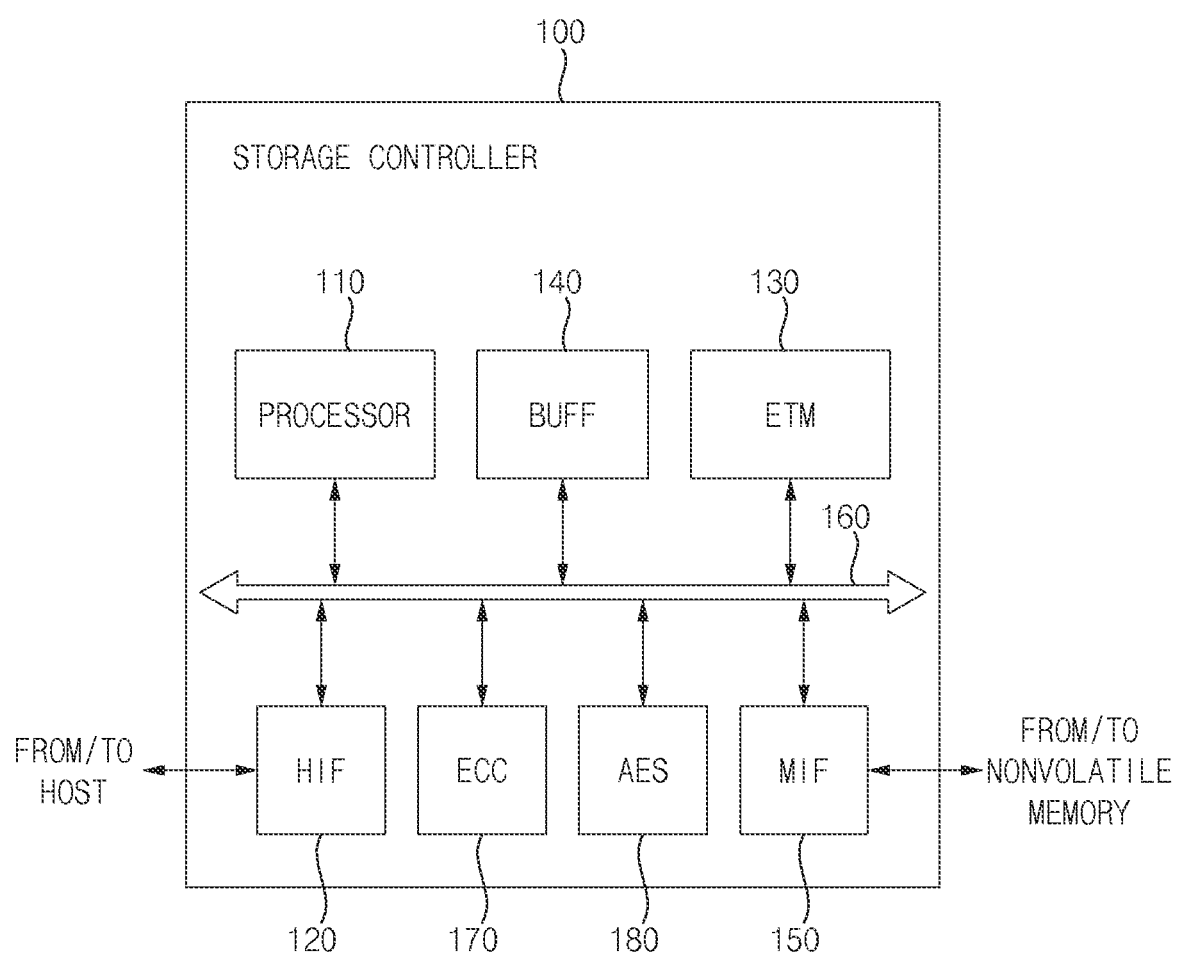
FIG. 5 is a block diagram illustrating a storage controller according to some implementations.

FIG. 5 is a block diagram illustrating a storage controller according to some implementations.

Referring to FIG. 5, a storage controller 100 may include a processor 110, a buffer memory (BUFF) 140, an exposure temperature monitor (ETM) 130, a host interface (HIF) 120, an error correction code (ECC) engine 170, a memory interface (MIF) 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 1100 in FIG. 1). For example, the processor 110 may control an operation of a storage device (e.g., the storage device 1200 in FIG. 1), and may control respective components by employing firmware for operating the storage device.

The buffer memory 140 may store instructions and data executed and processed by the processor 110. For example, the buffer memory 140 may be implemented with a volatile memory, such as a DRAM, a SRAM, a cache memory, or the like.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), and/or the like. In some implementations, the ECC engine 170 may perform ECC encoding and ECC decoding using above-described codes or other error correction codes.

The host interface 120 may provide physical connections between the host device 1100 and the storage device 1200. The host interface 120 may provide an interface that corresponds to a bus format of the host device 1100 for communication between the host device 1100 and the storage device 1200. In some implementations, the bus format of the host device 1100 may be a small computer system interface (SCSI) or a serial attached SCSI (SAS) interface. In other some implementations, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface 150 may exchange data with a nonvolatile memory device (e.g., the nonvolatile memory device 400 in FIG. 1). The memory interface 150 may transfer data to the nonvolatile memory device 400, and/or may receive data read from the nonvolatile memory device 400. In some implementations, the memory interface 150 may be connected to the nonvolatile memory device 400 via one channel. In other some implementations, the memory interface 150 may be connected to the nonvolatile memory device 400 via two or more channels. The memory interface 150 may be configured to comply with a standard protocol, such as Toggle or open NAND flash interface (ONFI).

The AES engine 180 may perform at least one of an encryption operation or a decryption operation on data input to the storage controller 100 using a symmetric-key algorithm. The AES engine 180 may include an encryption module and a decryption module. For example, the encryption module and the decryption module may be implemented as separate modules. In another example, one module capable of performing both encryption and decryption operations may be implemented in the AES engine 180.

The exposure temperature monitor 130 may control the non-volatile memory device to perform the monitoring program operation and the monitoring read operation as described above and below. The exposure temperature monitor 130 may generate the measurement retention value through the monitoring read operation and estimate the exposure temperature corresponding to the measured retention value based on reference information RFI.

Figure 6:
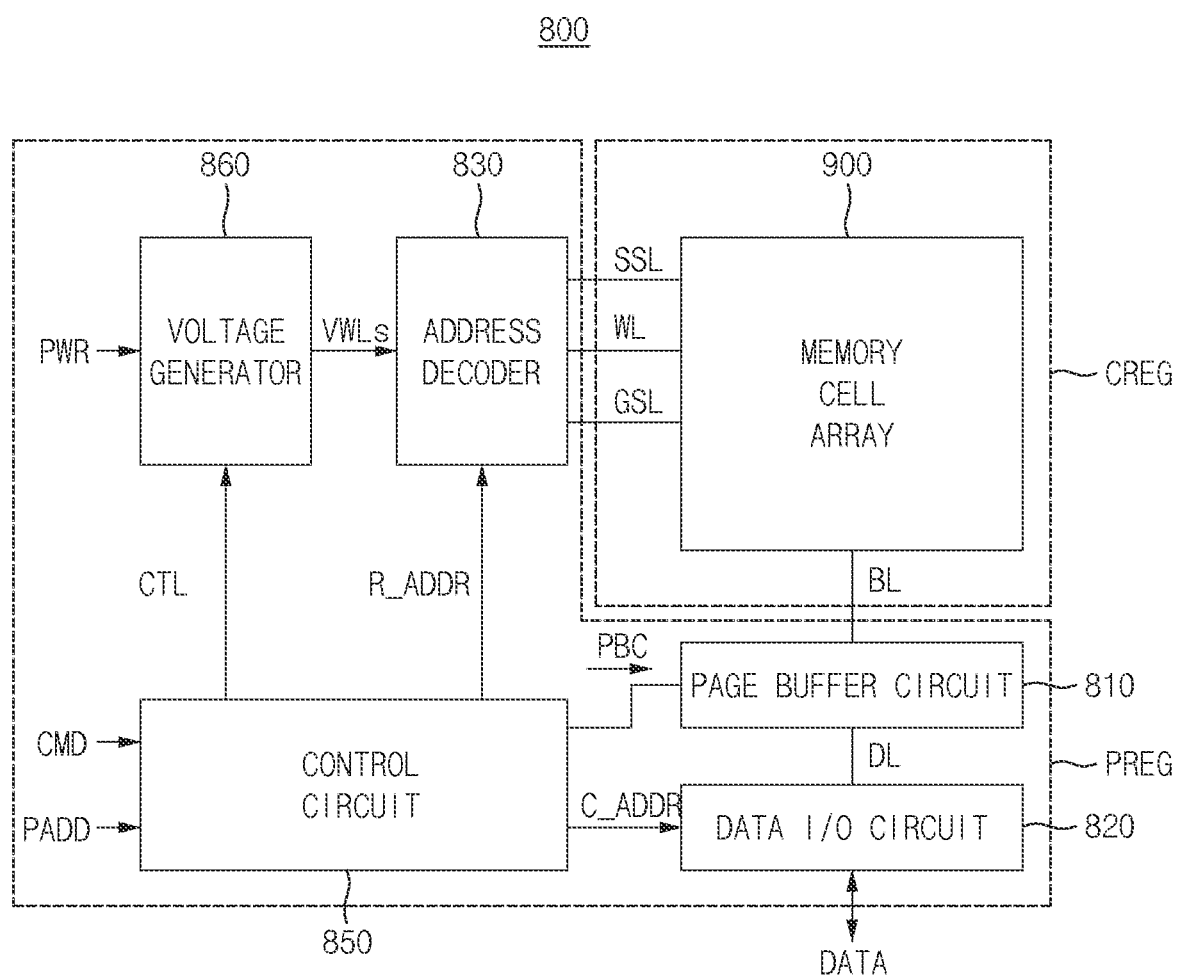
FIG. 6 is a block diagram illustrating a nonvolatile memory device according to some implementations.

FIG. 6 is a block diagram illustrating a nonvolatile memory device according to some implementations.

Referring to FIG. 6, a nonvolatile memory device 800 may include a memory cell array 900, a page buffer circuit 810, a data input/output (I/O) circuit 820, an address decoder 830, a control circuit 850, and a voltage generator 860. In some implementations, the nonvolatile memory device 800 may have a cell over periphery (COP) structure in which a memory cell array is arranged over peripheral circuits. In this case, the memory cell array 900 may be formed in a cell region CREG, and the page buffer circuit 810, the data I/O circuit 820, the address decoder 830, the control circuit 850, and the voltage generator 860 may be formed in a peripheral region PREG.

The memory cell array 900 may be coupled to the address decoder 830 through string selection lines SSL, wordlines WL, and ground selection lines GSL. The memory cell array 900 may be coupled to the page buffer circuit 810 through bitlines BL. The memory cell array 900 may include memory cells coupled to the wordlines WL and the bitlines BL. In some implementations, the memory cell array 900 may be a three-dimensional memory cell array, which may be formed on a substrate in a three-dimensional structure (or a vertical structure). In this case, the memory cell array 900 may include cell strings (e.g., NAND strings) that are vertically oriented such that at least one memory cell is located over another memory cell.

The control circuit 850 may receive a command signal CMD and an address signal PADD from a memory controller, and may control erase, program, and read operations of the nonvolatile memory device 800 in response to (or based on) at least one of the command signal CMD and the address signal PADD. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some implementations, the control circuit 850 may generate a control signals CTL used to control the operation of the voltage generator 860, and may generate a page buffer control signal PBC for controlling the page buffer circuit 810, based on the command signal CMD, and may generate a row address R_ADDR and a column address C_ADDR based on the address signal PADD. The control circuit 850 may provide the row address R_ADDR to the address decoder 830, and may provide the column address C_ADDR to the data I/O circuit 820.

The address decoder 830 may be coupled to the memory cell array 900 through the string selection lines SSL, the wordlines WL, and the ground selection lines GSL.

Hereinafter, the program operation may include both the normal program operation and the monitoring program operation for monitoring the exposure temperature, and the read operation may include both the normal read operation and the monitoring read operation for monitoring exposure temperature.

During the program operation or the read operation, the address decoder 830 may determine (or select) one of the wordlines WL as a selected wordline, and may determine or designate the remaining wordlines WL other than the selected wordline as unselected wordlines based on the row address R_ADDR.

In addition, during the program operation or the read operation, the address decoder 830 may determine one of the string selection lines SSL as a selected string selection line and determine or designate the remaining string selection lines SSL other than the selected string selection line as unselected string selection lines based on the row address R_ADDR. The aforementioned selected memory cells correspond to the memory cells connected to the selected wordline and the selected string selection line.

The voltage generator 860 may generate wordline voltages VWL, which are used for the operation of the memory cell array 900 of the nonvolatile memory device 800, based on the control signals CTL. The voltage generator 860 may receive the power PWR from the memory controller. The wordline voltages VWL may be applied to the wordlines WL through the address decoder 830.

In some implementations, during the erase operation, the voltage generator 860 may apply an erase voltage to a well and/or a common source line of a memory block, and may apply an erase permission voltage (e.g., a ground voltage) to all of the wordlines of the memory block or a portion of the wordlines based on an erase address. During the erase verification operation, the voltage generator 860 may apply an erase verification voltage simultaneously to all of the wordlines of the memory block or sequentially (e.g., one by one) to the wordlines.

In some implementations, during the program operation, the voltage generator 860 may apply a program voltage to the selected wordline, and may apply a program pass voltage to the unselected wordlines. During the program verification operation, the voltage generator 860 may apply a program verification voltage to the first wordline, and may apply a verification pass voltage to the unselected wordlines.

During the normal read operation, the voltage generator 860 may apply a read voltage to the selected wordline, and may apply a read pass voltage to the unselected wordlines. During the data recover read operation, the voltage generator 860 may apply the read voltage to a wordline adjacent to the selected wordline, and may apply a recover read voltage to the selected wordline.

The page buffer circuit 810 may be coupled to the memory cell array 900 through the bitlines BL. The page buffer circuit 810 may include multiple buffers. In some implementations, each buffer may be connected to only a single bitline. In some implementations, each buffer may be connected to two or more bitlines. The page buffer circuit 810 may temporarily store data to be programmed in a selected page or data read out from the selected page of the memory cell array 900.

The data I/O circuit 820 may be coupled to the page buffer circuit 810 through data lines DL. During the program operation, the data I/O circuit 820 may receive program data DATA received from the memory controller and provide the program data DATA to the page buffer circuit 810 based on the column address C_ADDR received from the control circuit 850. During the read operation, the data I/O circuit 820 may provide read data DATA, read from the memory cell array 900 and stored in the page buffer circuit 810, to the memory controller based on the column address C_ADDR received from the control circuit 850.

The page buffer circuit 810 and the data I/O circuit 820 may read data from a first area of the memory cell array 900, and may write this read data to a second area of the memory cell array 900 (e.g., without transmitting the data to a source external to the nonvolatile memory device 800, such as to the memory controller). Thus, the page buffer circuit 810 and the data I/O circuit 820 may perform a copy-back operation.

Figure 7:
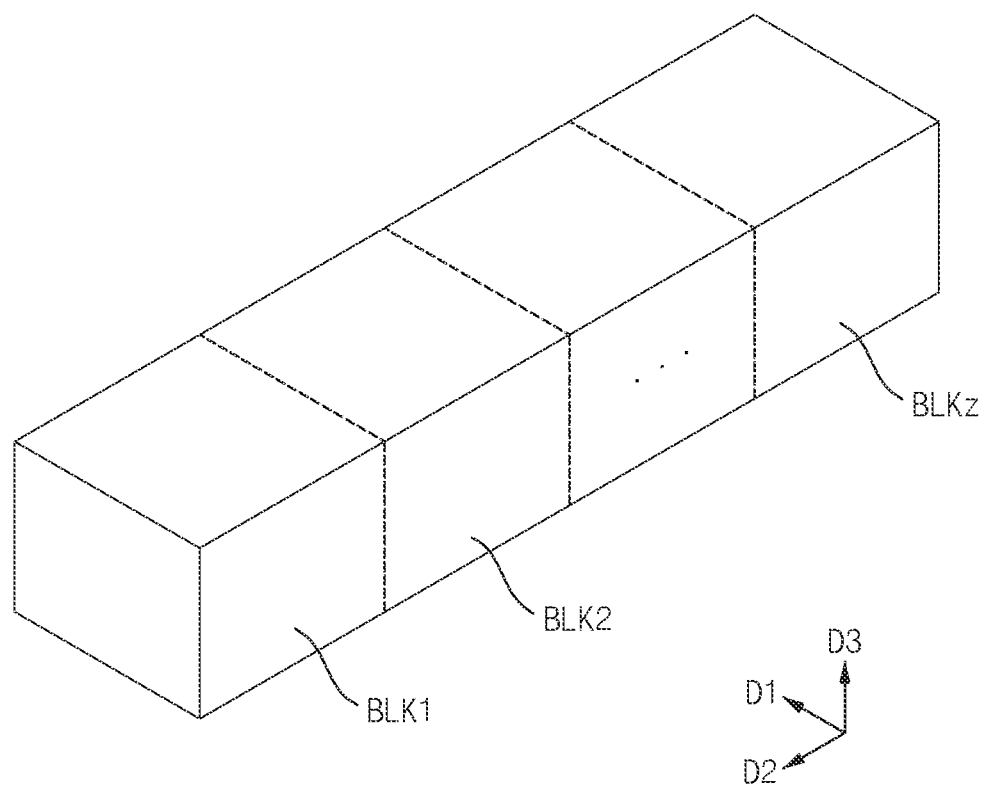
FIG. 7 is a block diagram illustrating a memory cell array included in the nonvolatile memory device of FIG. 6.
Figure 8:
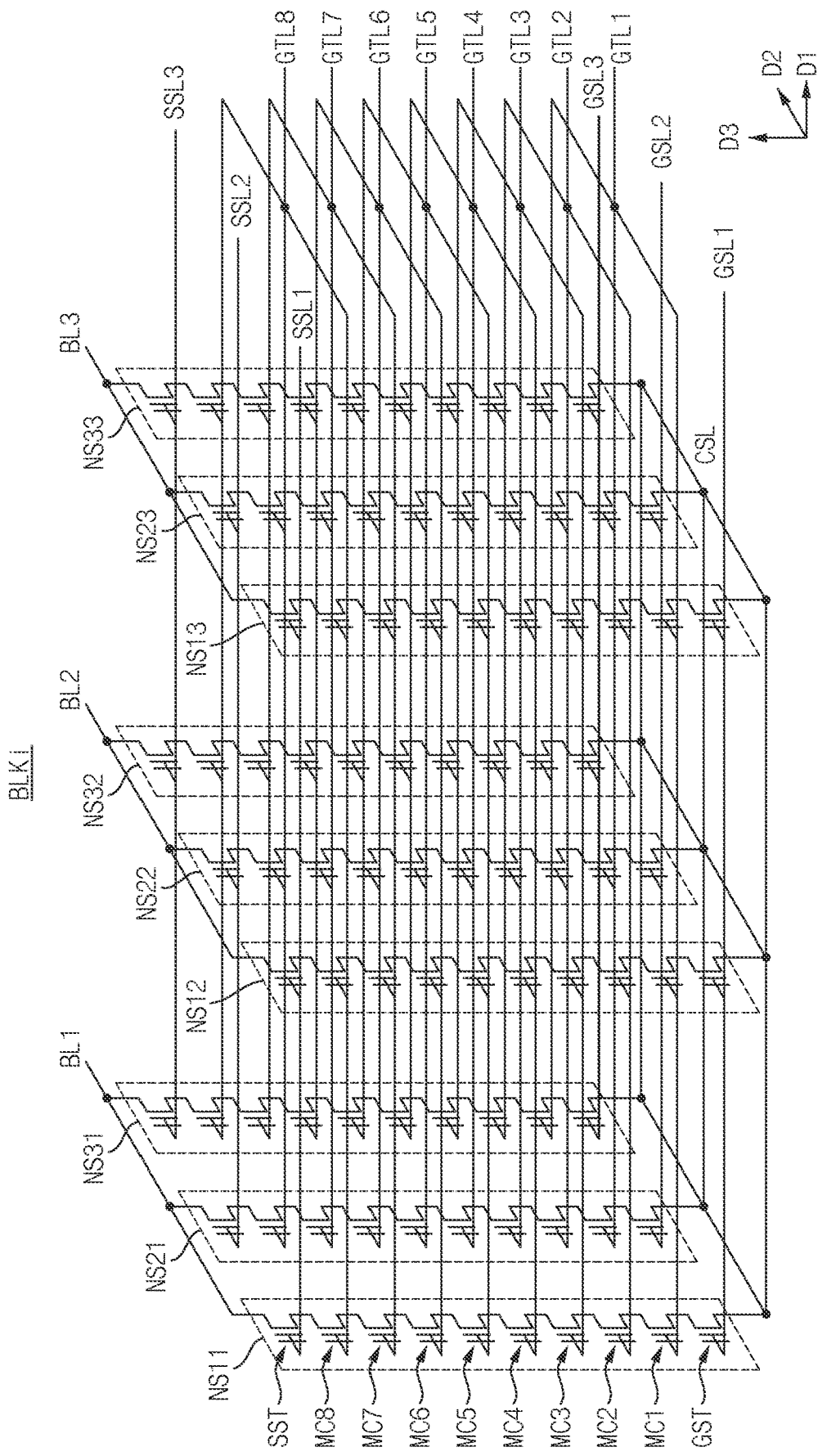
FIG. 8 is a circuit diagram illustrating an equivalent circuit of a memory block included in the memory cell array of FIG. 7.

FIG. 7 is a block diagram illustrating a memory cell array included in the nonvolatile memory device of FIG. 6, and FIG. 8 is a circuit diagram illustrating an equivalent circuit of a memory block included in the memory cell array of FIG. 7.

Referring to FIG. 7, the memory cell array 900 may include memory blocks BLK1 to BLKz. In some implementations, the memory blocks BLK1 to BLKz may be selected by the address decoder 830 of FIG. 6. For example, the address decoder 830 may select a particular memory block BLK corresponding to a block address among the memory blocks BLK1 to BLKz.

A memory block BLKi (i being an integer from 1 to z) of FIG. 8 may be formed on a substrate in a three-dimensional structure (or a vertical structure). For example, NAND strings or cell strings included in the memory block BLKi may be formed and stacked in a vertical direction D3 perpendicular to an upper surface of a substrate.

Referring to FIG. 8, the memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 8, each of the NAND strings NS11 to NS33 is illustrated to include eight memory cells MC1 to MC8. However, implementations are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be commonly connected, and the ground selection lines GSL1 to GSL3 and the string selection lines SSL1 to SSL3 may be separated. In FIG. 8, the memory block BLKi is illustrated as being coupled to eight gate lines GTL1 to GTL8 and three bitlines BL1 to BL3. However, implementations are not limited thereto, and each memory block in the memory cell array 900 may be coupled to various numbers of wordlines and various numbers of bitlines.

Figure 9:
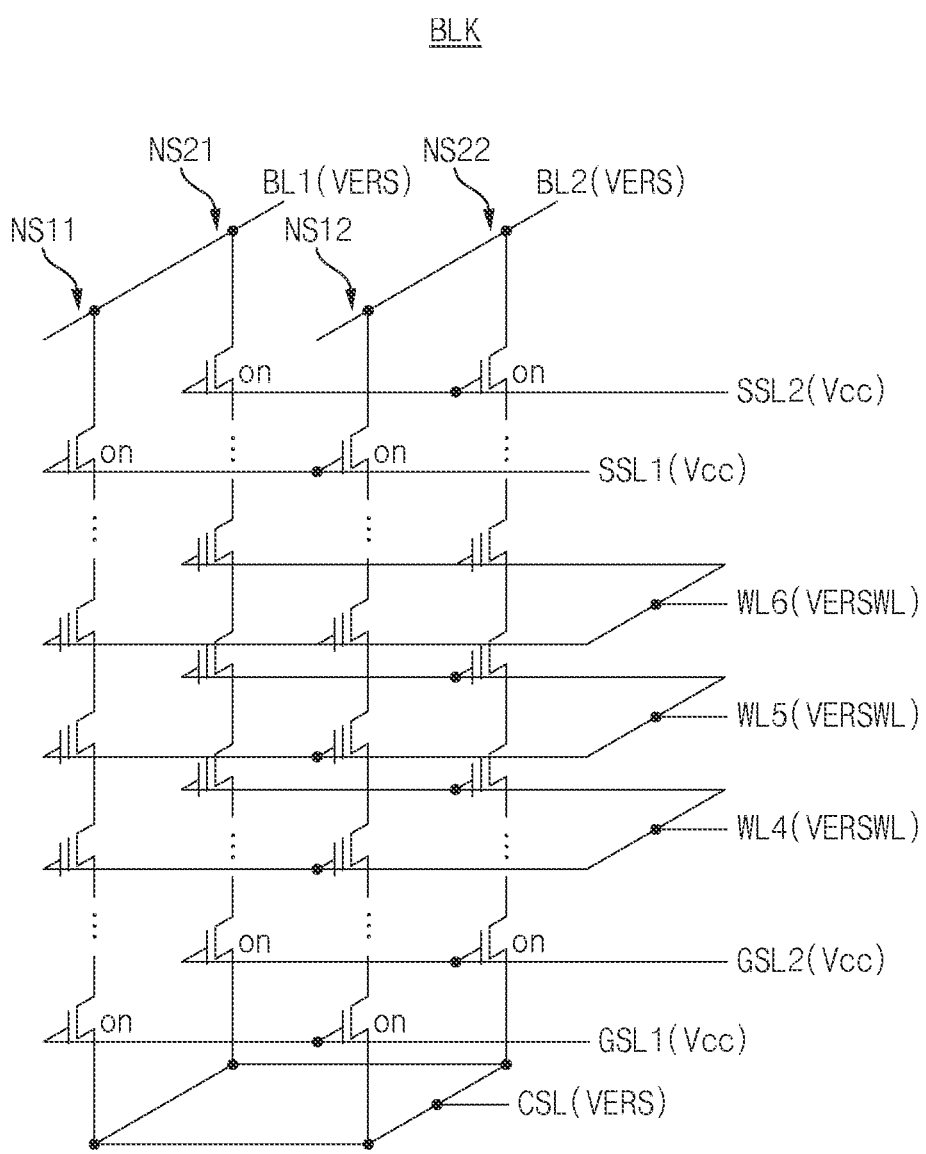
FIG. 9 is a circuit diagram illustrating an erase bias condition of a nonvolatile memory device according to some implementations.

FIG. 9 is a circuit diagram illustrating an erase bias condition of a nonvolatile memory device according to some implementations.

For convenience of description, NAND strings NS11 and NS21 connected to a first bitline BL1 and NAND strings NS12 and NS22 connected to a second bitline BL2 are illustrated in FIG. 9.

During an erase operation, an erase voltage VERS may be applied to the first bitline BL1 and the second bitline BL2. In this case, the power supply voltage Vcc, for example, is applied to the first string selection line SSL1 and the second string selection line SSL2. Also, during the erase operation, the erase voltage VERS may be applied to the common source line CSL. In this case, the power supply voltage Vcc may be applied to the first ground selection line GSL1 and the second ground selection line GSL2. The erase enable voltage VERSWL may be applied to the wordlines WL4, WL5 and WL6.

Under this erase bias condition, voltages of the drain and source of the memory cells of the memory block may be, for example, 20V, and a voltage of, for example, 0V may be applied to the gate. The voltage generator 860 of FIG. 6 may generate the erase voltage VERS applied to the bitlines BL1 and BL2 and/or the common source line CSL during the erase operation.

In some implementations, to promote deterioration of the retention characteristic of the target memory cells, the erase voltage VERS corresponding to the target memory cells may be set to be lower than the erase voltage VERS corresponding to typical memory cells that store data.

Figure 10:
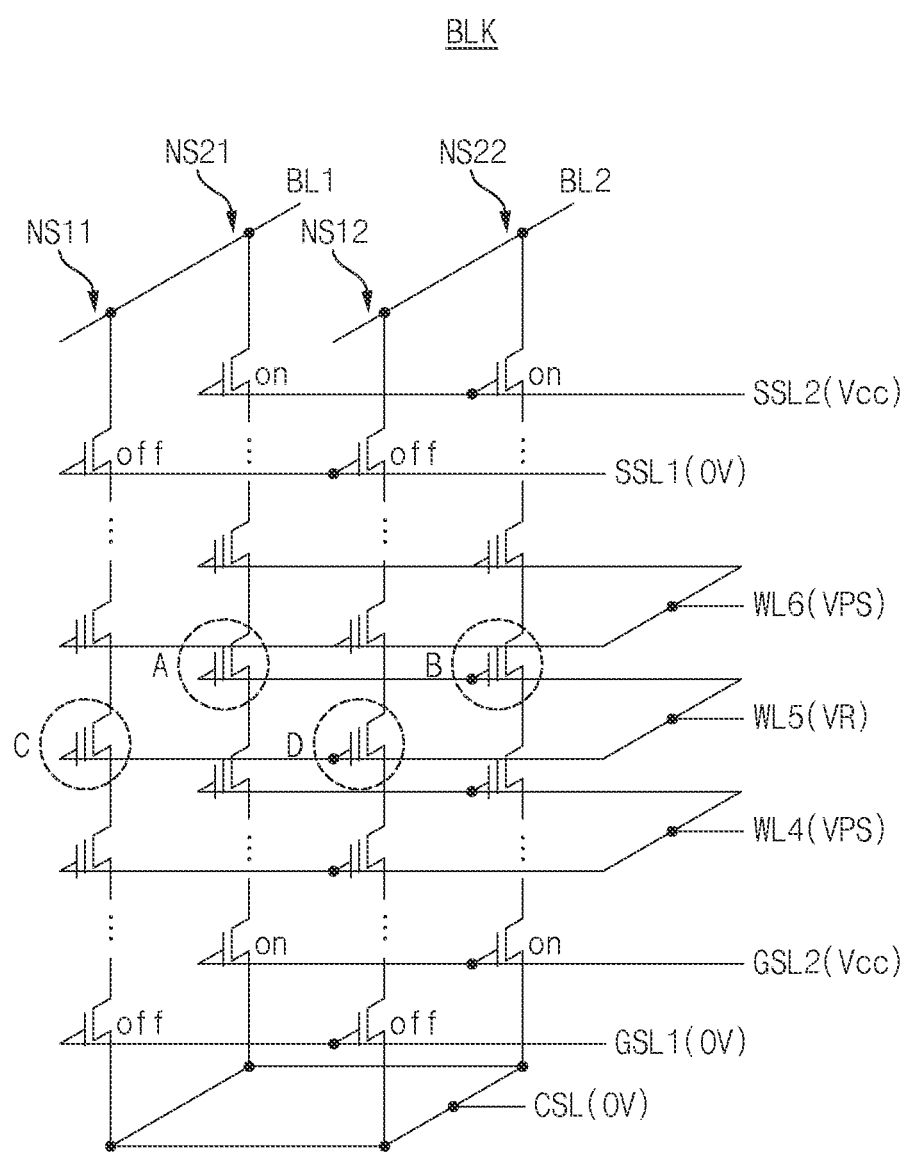
FIG. 10 is a circuit diagram illustrating a read bias condition of a nonvolatile memory device according to some implementations.

FIG. 10 is a circuit diagram illustrating a read bias condition of a nonvolatile memory device according to some implementations.

For convenience of description, NAND strings NS11 and NS21 connected to a first bitline BL1 and NAND strings NS12 and NS22 connected to a second bitline BL2 are illustrated in FIG. 10.

The first bitline BL1 and the second bitline BL2 may be precharged with a precharge voltage (e.g., 0.5 V). During a read operation, if NAND strings NS21 and NS22 are selected, a voltage of 0 V may be applied to the first string selection line SSL1 and a power supply voltage Vcc may be applied to the second string selection line SSL2. Furthermore, the voltage of 0 V may be applied to a first ground selection line GSL1 and the power supply voltage Vcc may be applied to a second ground selection line GSL2. A read voltage VR may be applied to a selected wordline (e.g., WL5) and a read pass voltage VPS may be applied to unselected wordlines (e.g., WL4 and WL6).

In this example of a read bias condition, the drain voltage of selected memory cells A and B may be, for example, 0.5 V and the source voltage of selected memory cells A and B may be, for example, 0 V. In addition, the read voltage VR is applied to gates of the selected memory cells A and B. Furthermore, a read operation for verifying data stored at a memory cell may be performed while changing a voltage level of the read voltage VR. Channels of unselected NAND strings NS11 and NS12 including memory cells C and D are floated. The voltage generator 860 of FIG. 6 may generate the read voltage VR and the read pass voltage VPS applied to the plurality of wordlines during the read operation.

Figure 11:
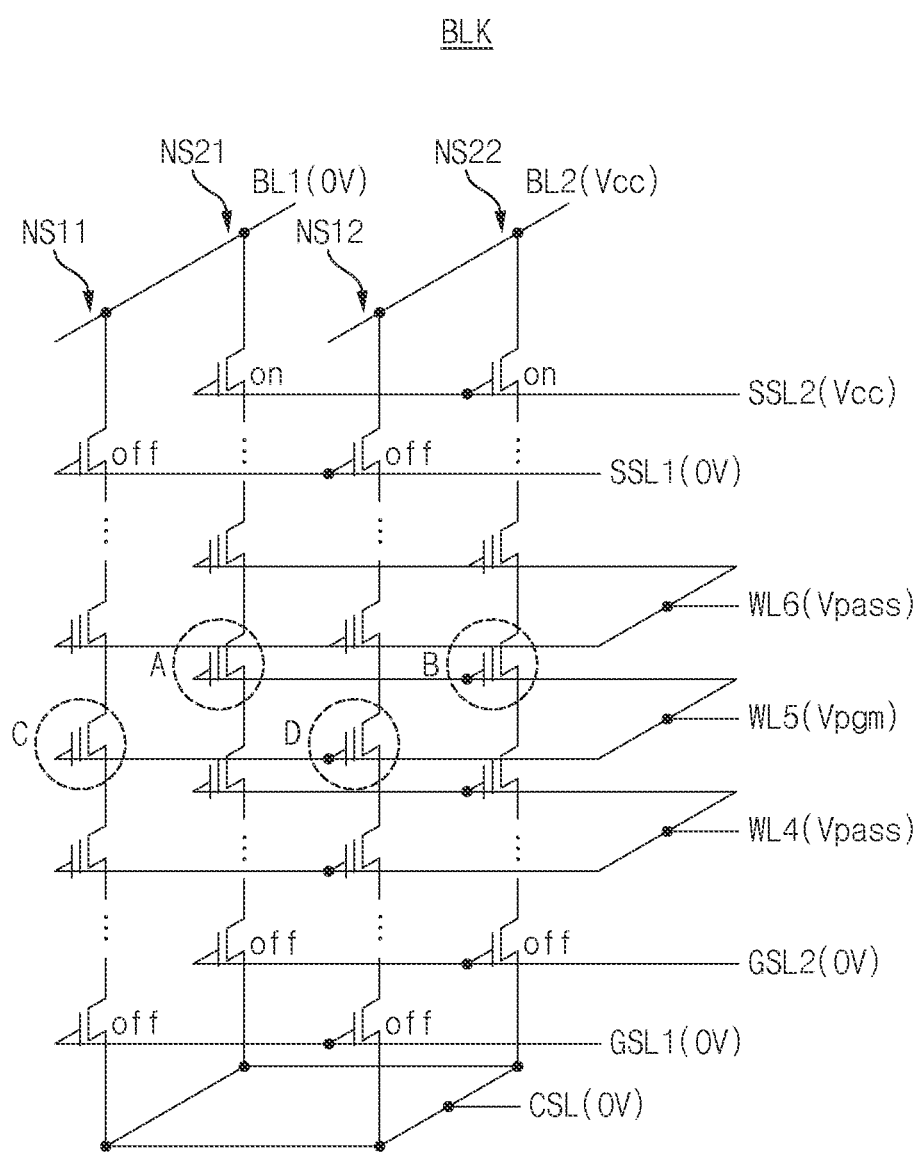
FIG. 11 is a circuit diagram illustrating a program bias condition of a nonvolatile memory device according to some implementations.

FIG. 11 is a circuit diagram illustrating a program bias condition of a nonvolatile memory device according to some implementations.

For convenience of description, NAND strings NS11 and NS21 connected to a first bitline BL1 and NAND strings NS12 and NS22 connected to a second bitline BL2 are illustrated in FIG. 11.

The first bitline BL1 may be a program bitline to which a program permission voltage (e.g., 0 V) is applied, and the second bitline BL2 may be a program inhibition bitline to which a program inhibition voltage such as a power supply voltage Vcc is applied. If the NAND string NS21 among the NAND strings NS11 and NS21 is selected, during a program operation, a voltage of 0 V may be applied to a first string selection line SSL1, and the power supply voltage Vcc may be applied to a second string selection line SSL2.

The voltage of 0 V may be applied to ground selection lines GSL1 and GSL2. Furthermore, a voltage (e.g., Vcc) higher than 0 V may be applied to a common source line CSL. A program voltage Vpgm (e.g., 18 V) may be applied to a selected wordline (e.g., WL5) and a pass voltage Vpass (e.g., 8 V) may be applied to unselected wordlines (e.g., WL4 and WL6).

Under the program bias condition, the program voltage Vpgm of 18V may be applied to a gate of a memory cell A having a channel voltage of 0 V. Since a strong electric field is formed between the gate and a channel of the memory cell A, the memory cell A may be programmed. However, since respective channels of memory cells C and D are in a floating state, channel voltages thereof may be boosted up to, for example, about 8 V, and thus, the memory cells C and D may not be programmed. The memory cell B may not be programmed because a weak electric field is formed between the gate of the memory cell B and the channel. The voltage generator 860 of FIG. 6 may generate the program voltage Vpgm and the program pass voltage Vpass applied to the plurality of wordlines during the program operation.

In some implementations, to promote deterioration of the retention characteristic of the target memory cells, the program voltage Vpgm corresponding to the target memory cells may be set to be higher than the program voltage Vpgm corresponding to typical memory cells that store data.

Figure 12A:
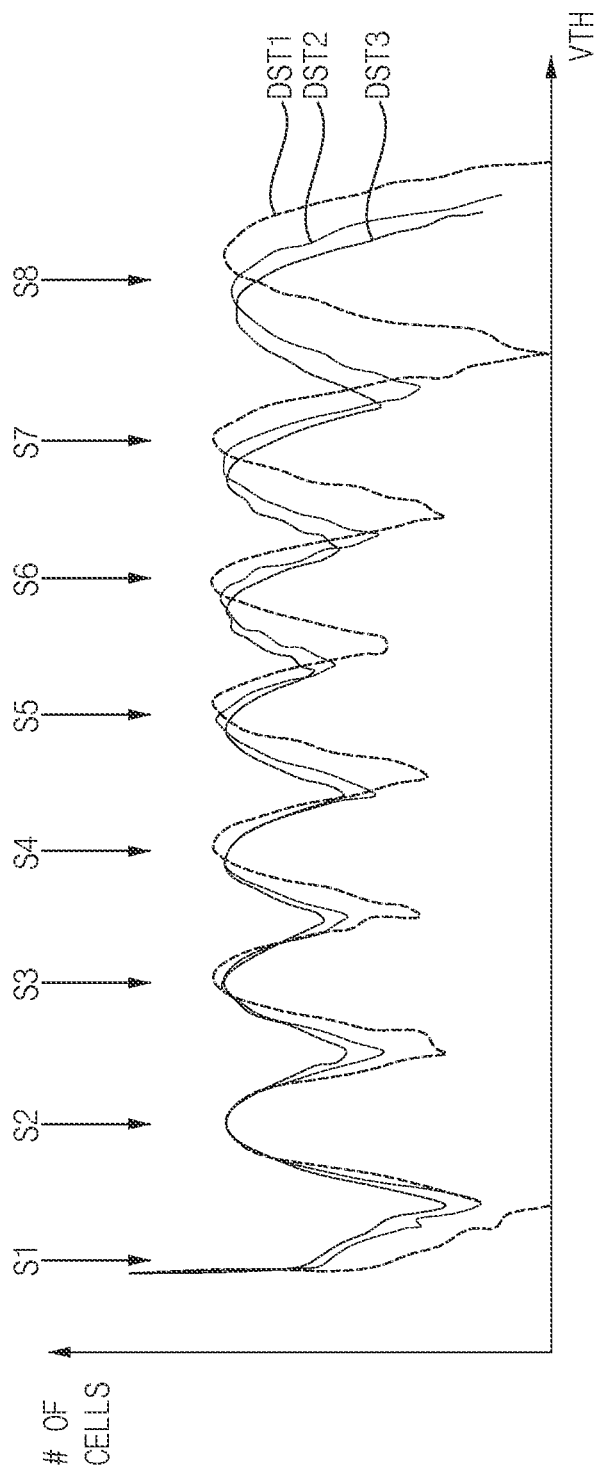
FIGS. 12A and 12B are diagrams illustrating degeneration of retention characteristic depending on a temperature in a nonvolatile memory device according to some implementations.
Figure 12B:
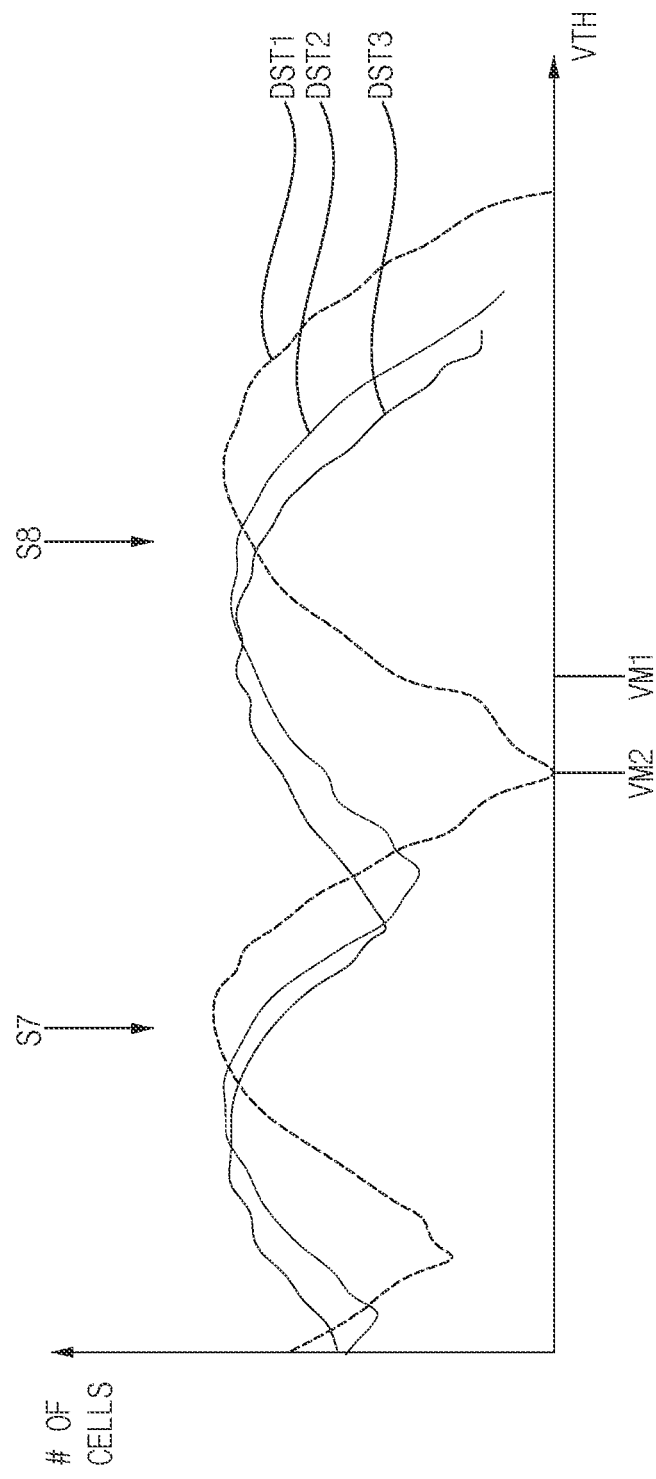

FIGS. 12A and 12B are diagrams illustrating degeneration of retention characteristics depending on a temperature in a nonvolatile memory device according to some implementations. FIG. 12B is an enlarged view of a portion of the threshold voltage range of FIG. 12A.

In FIGS. 12A and 12B, the horizontal axis represents the threshold voltage VTH of memory cells, and the vertical axis represents the number of memory cells corresponding to the threshold voltage VTH. FIG. 12A shows a TLC (triple level cell) scheme in which each memory cell stores a 3-bit value. However, implementations are not limited thereto and the number of bits stored in each memory cell may be determined according to other schemes.

FIGS. 12A and 12B show that retention characteristics deteriorate over time when a nonvolatile memory device is exposed to a specific exposure temperature. DST1 represents the threshold voltage distribution immediately after data is programmed, DST2 represents the threshold voltage distribution after a first exposure time has elapsed, and DST3 represents the threshold voltage distribution after a second exposure time longer than the first exposure time has elapsed. As shown in FIGS. 12A and 12B, it may be seen that the program state with the highest threshold voltage distribution, that is, the eighth state S8, has the greatest degradation. In other words, it may be seen that the number of memory cells belonging to the threshold voltage range between a first monitoring voltage VM1 and a second monitoring voltage VM2 changes the most. Considering the retention characteristics of the nonvolatile memory device, the retention value for estimating the exposure temperature described above may be appropriately determined.

Figures 13, 14A:
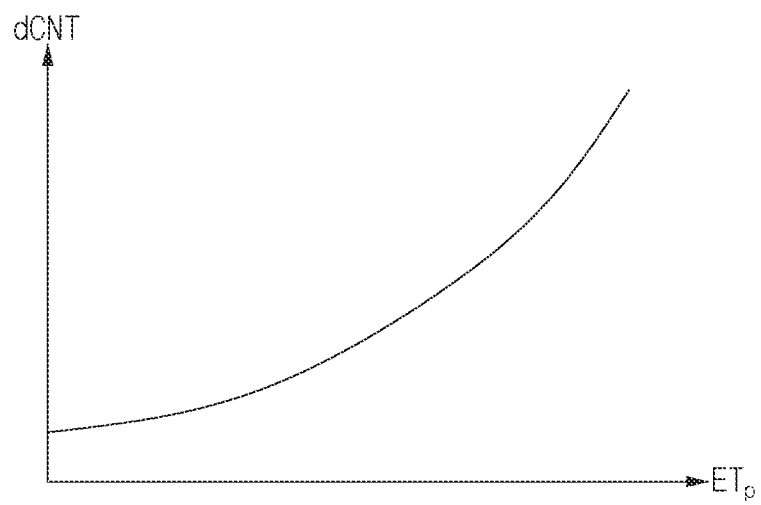
FIGS. 13, 14A and 14B are diagram illustrating change of a retention value depending on an exposure temperature and an exposure time in a nonvolatile memory device in a power-off state.
Figure 14B:
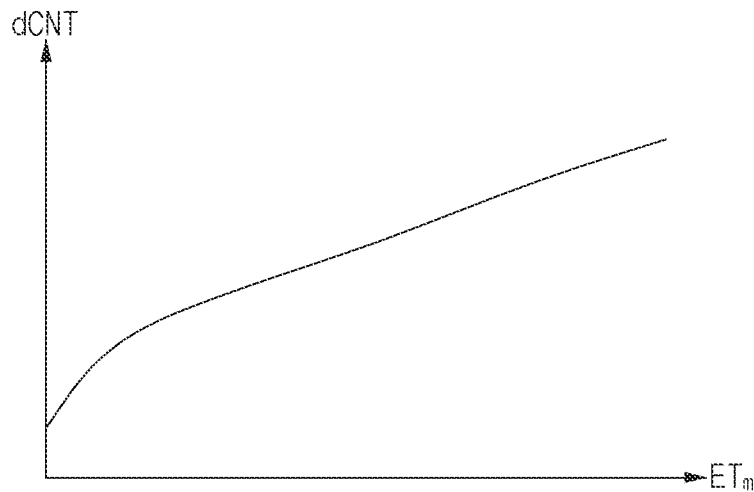

FIGS. 13, 14A and 14B are diagram illustrating change of a retention value depending on an exposure temperature and an exposure time in a nonvolatile memory device in a power-off state.

FIG. 13 shows exposure conditions EPC and retention values RTV corresponding to the exposure conditions EPC. In FIGS. 13, A, B, C, D, and E represent each exposure time ETm, and Pi, Qi, and Ri (i=0, 1, 2) are retention values dCNT, CNT, and NEB corresponding to the exposure time ETm, respectively.

The exposure condition EPC may include at least an exposure temperature ETp and an exposure time ETc. As will be described below with reference to FIG. 25, the exposure condition EPC may further include factors other than or in addition to the exposure temperature ETp and exposure time ETc. The more various factors of the exposure condition are considered, the more accurate the exposure temperature may be estimated, but the size of the reference information RFI increases and the power and time required to generate the measured retention value may increase. The type and number of appropriate exposure conditions EPC may be determined considering the precision of the required exposure temperature estimation.

FIG. 13 shows, as an example, three types of retention values dCNT, CNT and NEB. These retention values dCNT, CNT and NEB will be described below with reference to FIGS. 15, 16, and 17.

FIG. 14A shows a trend of the retention value dCNT according to the exposure temperature ETp, and FIG. 14B shows a trend of the retention value dCNT according to the exposure time ETm. As shown in FIGS. 14A and 14B, the retention value dCNT has non-linear characteristics with respect to the exposure condition ETp and ETm. The retention value dCNT is shown to increase as a function of each of ETp and ETm.

Figure 15:
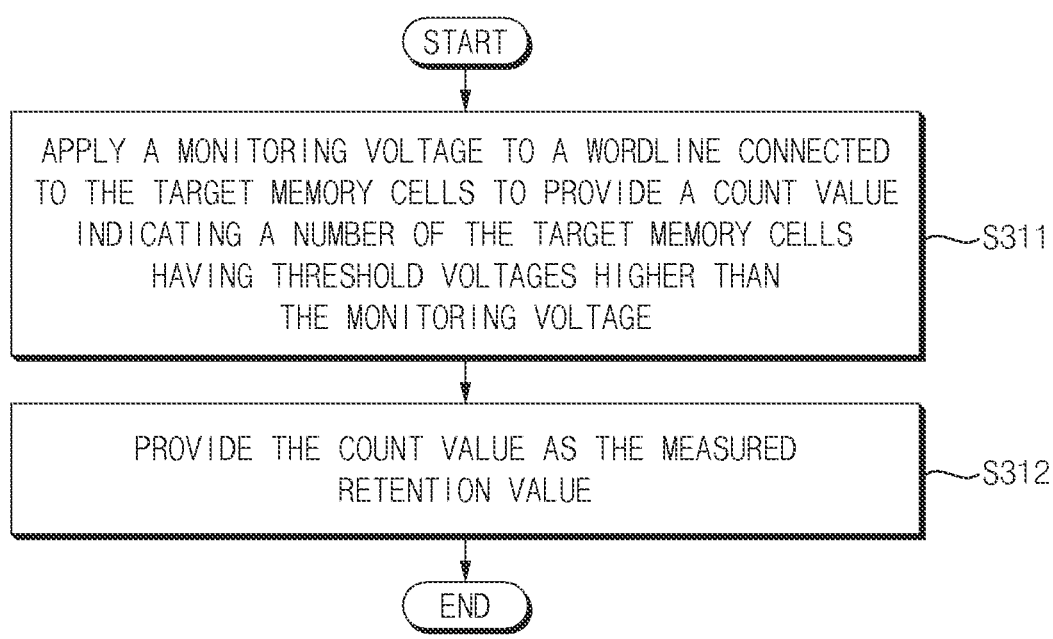
FIGS. 15, 16 and 17 are flowcharts illustrating some implementations of generating a retention value in a method of providing an exposure temperature of a nonvolatile memory device in a power-off state according to some implementations.
Figure 16:
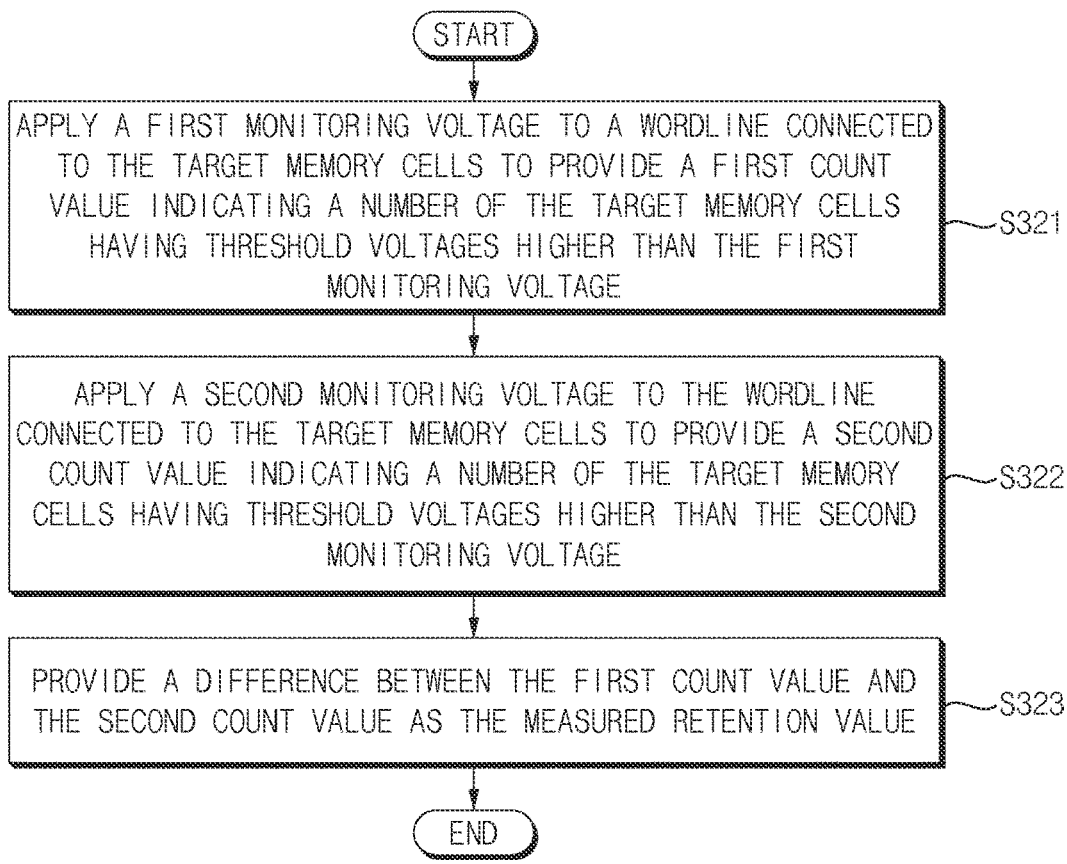
Figure 17:
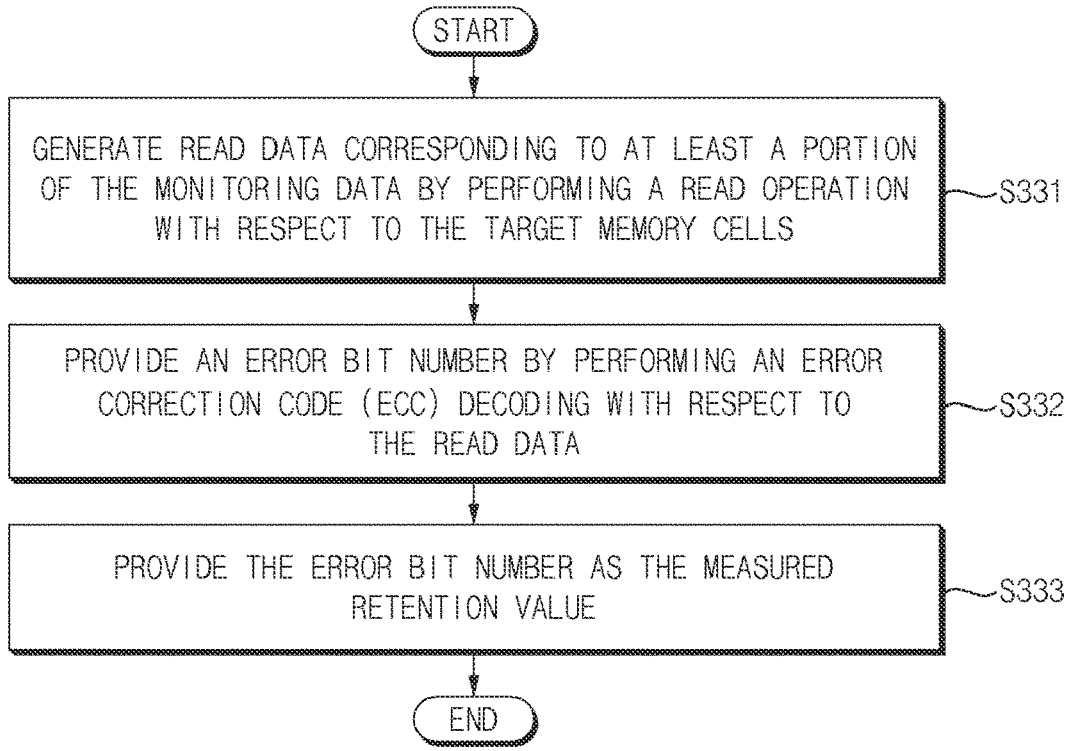

FIGS. 15, 16 and 17 are flowcharts illustrating some implementations of generating a retention value in a method of providing an exposure temperature of a nonvolatile memory device in a power-off state according to some implementations.

Referring to FIGS. 1 and 15, the exposure temperature monitor ETM may apply a monitoring voltage (for example, VM1 in FIG. 12B) to a word line connected to the target memory cells to provide a count value (for example, CNT in FIG. 13) indicating a number of the target memory cells having threshold voltages higher than the monitoring voltage VM1 (S311). The exposure temperature monitor ETM may provide the count value CNT as the above-described measured retention value (S312).

Referring to FIGS. 1 and 16, the exposure temperature monitor ETM may apply a first monitoring voltage (for example, VM1 in FIG. 12B) to the word line connected to the target memory cells to provide a first count value indicating a number of the target memory cells having threshold voltages higher than the first monitoring voltage VM1 (S321). In addition, the exposure temperature monitor ETM may apply a second monitoring voltage (for example, VM2 in FIG. 12B) lower than the first monitoring voltage VM1 to provide a second count value indicating a number of the target memory cells having threshold voltages higher than the second monitoring voltage VM2 (S322). The exposure temperature monitor ETM may provide a difference (for example, dCNT in FIG. 13) between the first count value and the second count value as the above-described measured retention value (S323).

Referring to FIGS. 1 and 17, the exposure temperature monitor ETM may generate read data corresponding to at least a portion of the monitoring data by performing a read operation with respect to the target memory cells (S331). The ECC engine 170 in FIG. 5 may provide an error bit number (for example, NEB in FIG. 13) by performing the ECC decoding with respect to the read data (S332). The exposure temperature monitor ETM may provide the error bit number NEB as the above-described measured retention value (S333).

For example, as described with reference to FIG. 4, when three bits are written to each memory cell, MSB page data may be read using the third read voltage VR3 and the seventh read voltage VR7. In this case, as shown in FIGS. 12A and 12B, the greatest deterioration in retention characteristics corresponds to the eighth state S8, and MSB page data may best reflect the deterioration in retention characteristics.

In some implementations, when a plurality of bits are written to each of the target memory cells, read data for the monitoring read operation may correspond to the MSB page data corresponding to the most significant bit among the plurality of bits. The time for estimating exposure temperature may be reduced by using only the MSB page data with the greatest deterioration characteristics among the monitoring data.

FIG. 18 is a flowchart illustrating an example of generating reference information in a method of providing an exposure temperature of a nonvolatile memory device in a power-off state according to some implementations.

Referring to FIG. 18, a test program operation may be performed to write monitoring data to test memory cells of a test nonvolatile memory device (S110). The monitoring data of the test program operation may be equal to the monitoring data of the monitoring program operation for estimating the exposure temperature described above.

The test nonvolatile memory device may be exposed to a test environment corresponding to a test condition including a test temperature and a test time (S120). The test environment may be implemented using a test chamber for testing semiconductor devices. To shorten the test time, the test nonvolatile memory device may be exposed to a relatively high exposure temperature for a relatively short exposure time, and then the retention value corresponding to the lower exposure temperature and longer exposure time may be estimated through simulation.

After the test nonvolatile memory device is exposed to the test environment, the retention value corresponding to the test condition may be generated by performing a test read operation with respect to the test memory cells (S130).

In some implementations, a physical location of the test memory cells in the test nonvolatile memory device for the reference information RFI may be equal to a physical location of the target memory cells in the nonvolatile memory device for monitoring of the exposure temperature. As will be described below with reference to FIGS. 26 and 27, the deterioration of retention characteristics depending on the exposure temperature of memory cells may vary depending on the physical location of the nonvolatile memory device. By setting the physical position of the test memory cells to be the same as the physical position of the target memory cells, the correlation between reference information RFI and the measured retention value may be further increased, and the accuracy of exposure temperature estimation may be improved.

In some implementations, the location in the memory block of the word line connected to the test memory cells may be the same as the location in the memory block of the word line connected to the target memory cells. According to some implementations, the memory block to which the target memory cells belong may be changed. In this case, the physical positions of the wordline for the reference information RFI and the wordline for estimating the exposure temperature may be set to be equal, and the accuracy of estimation of the measured exposure temperature may be improved.

In some implementations, the operating conditions of the test program operation may be equal to the operating conditions of the monitoring program operation, and the operating conditions of the test read operation may be equal to the operating conditions of the monitoring read operation. Here, the operating conditions may include operating voltage, operating timing, etc.

The processes of FIG. 18 may be repeated while varying exposure conditions such as the exposure time and the exposure temperature. The reference information RFI may be generated based on the plurality of exposure conditions and the retention values corresponding to the plurality of exposure conditions.

FIG. 19 is a diagram illustrating an example of reference information in a method of providing an exposure temperature of a nonvolatile memory device in a power-off state according to some implementations.

In some implementations, the reference information RFI may be provided as a reference table RFTBL including a plurality of different combinations of the exposure time ETm, the retention value VL, and the exposure temperature ETp as shown in FIG. 19. Once the measured retention value is obtained through exposure temperature monitoring as described above, the exposure temperature ETp corresponding to the combination of exposure time ETm and measured retention value VL may be extracted using the reference table RFTBL. Combinations of exposure time ETm and measured retention value VL that are not included in the reference table RFTBL may be obtained by interpolation. For example, the exposure temperature corresponding to the combination of the exposure time between two exposure times ta and tb and the measured retention value between two measured retention values VLc and VLd may be obtained by the interpolation using the four exposure temperatures T1, T2, T3 and T4.

In some implementations, the reference information RFI may be provided in the form of a function that has at least the exposure time ETm and the retention value VL as inputs and the exposure temperature ETp as output. The function may be obtained through various fitting methods using multiple test results as shown in FIG. 19.

In some implementations, as will be described below with reference to FIGS. 20 through 25, the reference information RFI may be provided as an artificial neural network that has at least the exposure time ETm and the retention value VL as input and the exposure temperature ETp as an output.

Figure 20:
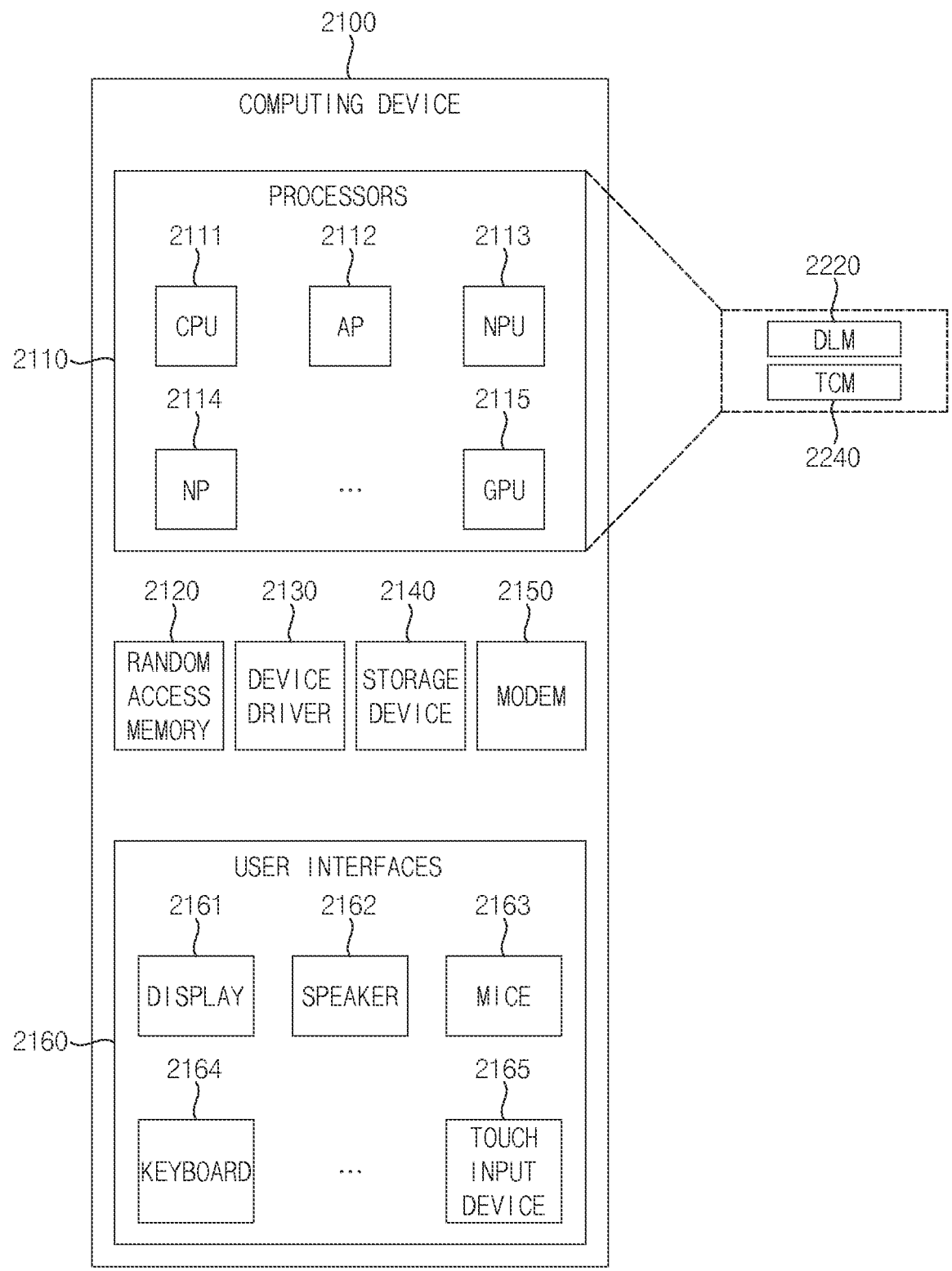
FIG. 20 is a block diagram illustrating a computing device according to some implementations.

FIG. 20 is a block diagram illustrating a computing device according to some implementations.

Referring to FIG. 20, a computing device 2100 includes processors 2110, a random access memory 2120, a device driver 2130, a storage device 2140, a modem 2150, and user interfaces 2160.

At least one of the processors 2110 may execute a deep learning model (DLM) 2220 and a training control module (TCM) 2240 that controls training of the deep learning model 2200. The training control module 2240 may train the deep learning model 2220 to perform the estimation of the exposure temperature as described above.

In some implementations, the deep learning model 2220 and the training control module 2240 may be implemented in the form of instructions (or program codes) executed by at least one of the processors 2110. The deep learning model 2220 and the training control module 2240 may be stored in a computer-readable recording medium. Here, at least one processor may load instructions (or program codes) of the deep learning model 2220 and the training control module 2240 into the random access memory 2120.

In some implementations, at least one processor may be manufactured to implement deep learning model 2220 and training control module 2240. As another example, at least one processor may be manufactured to implement various machine learning modules or deep learning models. At least one processor may implement the deep learning model 2220 and the training control module 2240 by receiving information corresponding to the deep learning model 2220 and the training control module 2240.

The processors 2110 may include at least one general-purpose processor, such as a central processing unit (CPU) 2111, an application processor (AP), etc. The processors 2110 may also include at least one special-purpose processor, such as a neural processing unit 2113, a neuromorphic processor 2114, a graphics processing unit 2115 (GPU), etc. The processors 2110 may include two or more processors of the same type.

The random access memory 2120 is used as an operating memory of the processors 2110 and may be used as a main memory or system memory of the computing device 2100. The random access memory 2120 includes volatile memory, such as dynamic random access memory or static random access memory, or non-volatile memory, such as phase change random access memory, ferroelectric random access memory, magnetic random access memory, or resistive random access memory.

The device driver 2130 may control peripheral devices such as a storage device 2140, a modem 2150, and user interfaces 2160 according to requests from the processors 2110. The storage device 2140 may include a fixed storage device such as a hard disk drive, a solid state drive, or a removable storage device such as an external hard disk drive, an external solid state drive, or a removable memory card.

The modem 2150 may provide remote communication with external devices. The modem 2150 may perform wireless or wired communication with an external device. The modem 2150 may communicate with an external device through at least one of various communication forms such as Ethernet, Wi-Fi, LTE, and 5G mobile communication.

The user interfaces 2160 may receive information from, and provide information to, the user. The user interfaces 2160 include at least one user output interface such as a display 2161, a speaker 2162, etc., and at least one user input interface such as a mouse (mice) 2163, a keyboard 2164, a touch input device 2165, etc.

Instructions (or program codes) of the deep learning model 2220 and the training control module 2240 may be received through the modem 2150 and stored in the storage device 2140. The instructions (or program codes) of the deep learning model 2220 and the training control module 2240 may be stored in a removable storage device that is coupled to computing device 2100. The instructions (or program codes) of the deep learning model 2220 and the training control module 2240 may be loaded from the storage device 2140 to the random access memory 2120 and then executed.

Computer program instructions, deep learning models DLMs, and training control modules TCMs may be stored on transitory computer-readable media or non-transitory computer-readable media. Additionally, in at least some implementations, the result values generated by the processor or the values of the arithmetic processing performed by the processor may be stored in a transitory computer-readable medium or a non-transitory computer-readable medium. Additionally, in at least some implementations, intermediate values generated during deep learning may be stored in a transitory computer-readable medium or a non-transitory computer-readable medium. However, the some implementations are not limited thereto.

Figure 21:
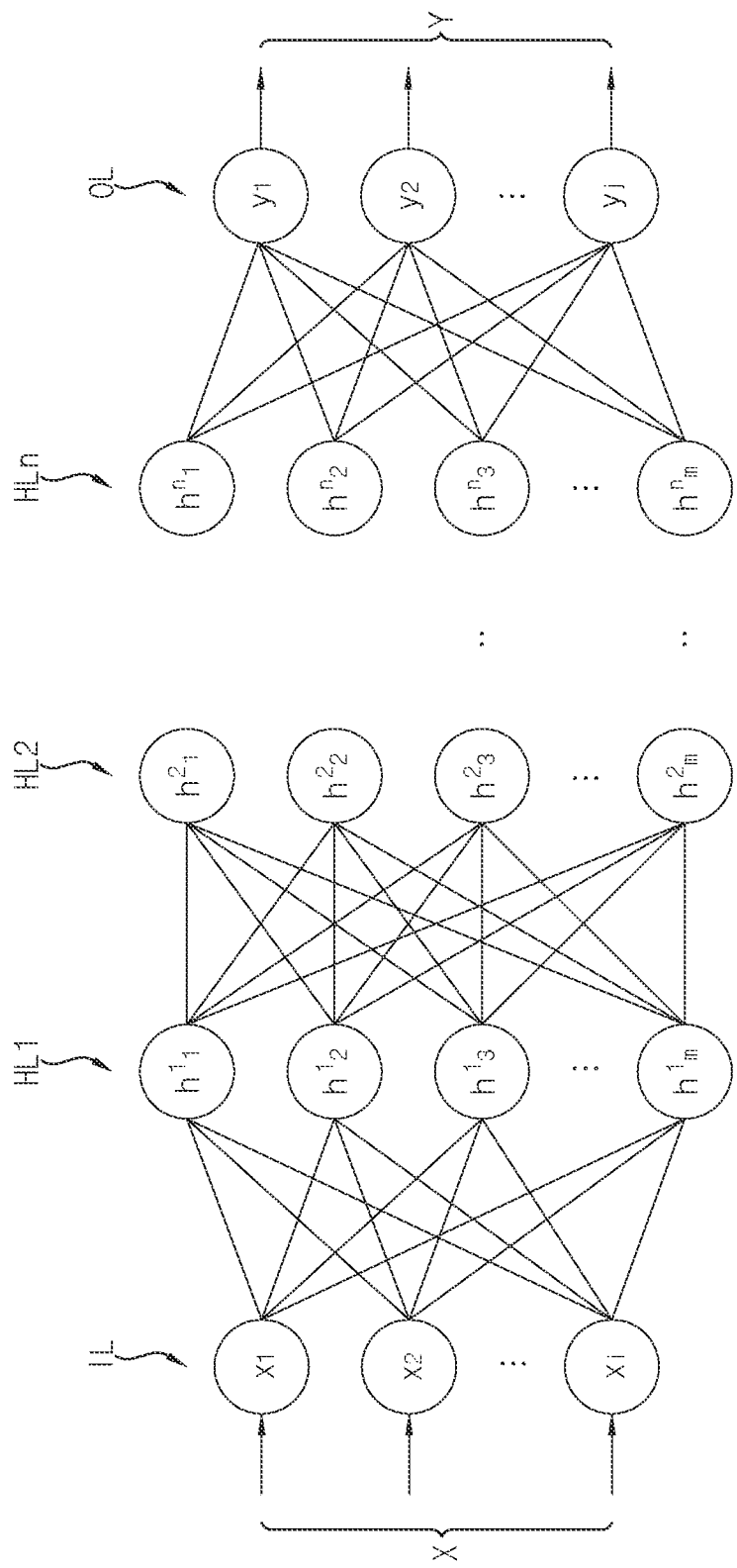
FIGS. 21 and 22 are diagrams for describing examples of a deep learning neural network structure that is driven by a machine learning device according to some implementations.
Figure 22:
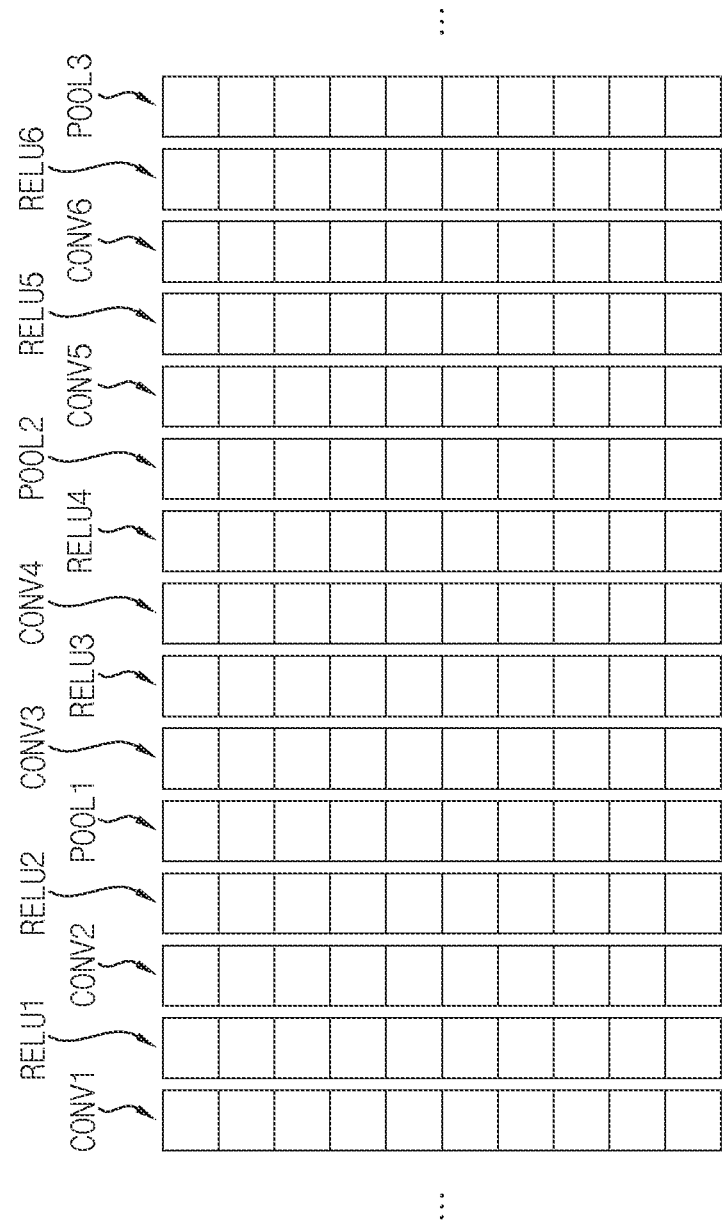

FIGS. 21 and 22 are diagrams for describing examples of a deep learning neural network structure that is driven by a machine learning device according to some implementations.

Referring to FIG. 21, a general neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) X whose length is i may be input to the input nodes x1, x2, . . . , xi such that each element of the input data X is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h^n_1$, $h^n_2$, $h^n_3$, . . . , $h^n_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1, h''_2, h''_3, \ldots, h''_m$, where m is a natural number.

The output layer OL may include j output nodes y1, y2, . . . , yj, providing output data Y where j is a natural number. The output layer OL may output the output data Y associated with the input data X.

A structure of the neural network illustrated in FIG. 21 may be represented by information on branches (and/or connections) between nodes illustrated as lines, and a weighted value assigned to each branch. Nodes within one layer may not be connected to one another, but nodes of different layers may be fully (and/or partially) connected to one another.

Each node (e.g., the node $h^1_1$) may receive an output of a previous node (e.g., the node $x_1$), may perform a computing operation, computation and/or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer may be referred to as "training data," and a process of determining the weighted value may be referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 21 may not be suitable for handling input image data (or input sound data) because each node (e.g., the node $h^1_1$) is connected to all nodes of a previous layer (e.g., the nodes x1, x2, . . . , xi included in the layer IL) and then the number of weighted values drastically increases as the size of the input image data increases. Thus, a convolutional neural network ("CNN"), which is implemented by combining the filtering technique with the general neural network, has been researched such that two-dimensional image (e.g., the input image data) is efficiently trained by the convolutional neural network.

Referring to FIG. 22, a convolutional neural network (CNN) may include a plurality of layers CONV1, RELU1, CONV2, RELU2, POOL1, CONV3, RELU3, CONV4, RELU4, POOL2, CONV5, RELU5, CONV6, RELU6, POOL3, and (not shown in FIG. 22) FC.

Unlike the general neural network, each layer of the convolutional neural network may have three dimensions of width, height, and depth, and thus data that is input to each layer may be volume data having three dimensions of width, height, and depth.

Each of convolutional layers CONV1, CONV2, CONV3, CONV4, CONV5, and CONV6 may perform a convolutional operation on input volume data. For example, in an image processing, the convolutional operation represents an operation in which image data is processed based on a mask with weighted values and an output value is obtained by multiplying input values by the weighted values and adding up the total multiplied values. The mask may be referred to as a filter, window, and/or kernel.

In further detail, parameters of each convolutional layer may include a set of learnable filters. Every filter may be spatially small (e.g., along width and height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, output volume data of the convolutional layer CONV1 may have a size of 32×32×12 (e.g., a depth of volume data increases).

Each of the rectifying linear unit (RELU) layers RELU1, RELU2, RELU3, RELU4, RELU5, and RELU6 may perform a rectified linear unit operation that corresponds to an activation function defined by, e.g., a function $f(x)=\max(0, x)$ (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2, and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing characteristics of the input data X. The type and number of layers including in the convolution neural network may be changed variously.

Some implementations of the deep learning model are not limited to a specific neural network. The deep learning model may include, for example, at least one of PNN (Perceptron Neural Network), CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network, BNN (Bayesian Neural Network), and/or the like. Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests.

Figure 23:
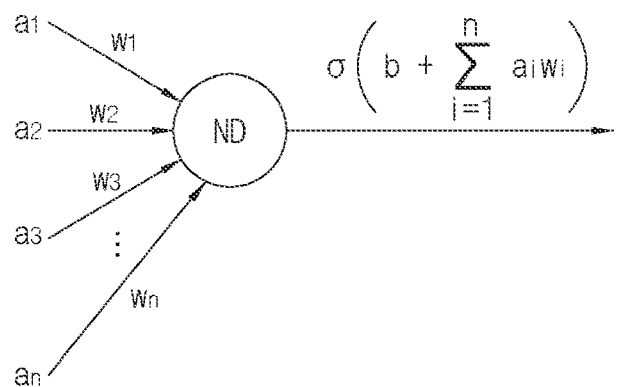
FIG. 23 is a diagram illustrating an example of a node included in a neural network.

FIG. 23 is a diagram illustrating an example of a node included in a neural network.

FIG. 23 illustrates an example node operation performed by a node ND in a neural network. When N inputs a1~an are provided to the node ND, the node ND may multiply the n inputs a1~an and corresponding n weights w1~wn, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

In cases of predicting an exposure temperature based on deep learning, a sufficient amount of training data and/or learning data may be utilized in (and/or required for) training of a deep learning model (and/or deep learning module). For example, training data of various kinds may be utilized (and/or required) to prevent over-fitting during training and enhance performance of the deep learning model.

According to some implementations, a database for training a deep learning model may be efficiently established by generating training data in the same manner as generating the reference table RFTBL as described above with reference to FIG. 19.

Figure 24:
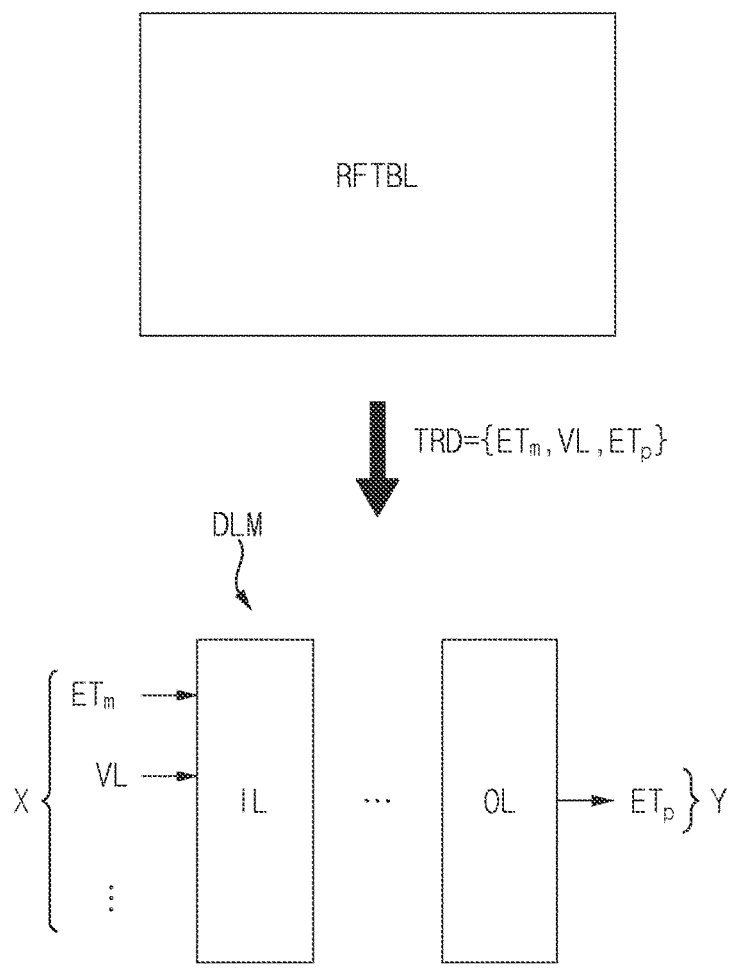
FIG. 24 is a diagram illustrating an example of a deep learning model in a method of providing an exposure temperature of a nonvolatile memory device in a power-off state according to some implementations.

FIG. 24 is a diagram illustrating an example of a deep learning model in a method of providing an exposure temperature of a nonvolatile memory device in a power-off state according to some implementations. For convenience of illustration, detailed configuration of a deep learning model is omitted and only an input layer IL receiving input data X and an output layer OL providing output data Y are illustrated in FIG. 24.

Referring to FIG. 24, a deep learning model DLM that may replace the reference table RFTBL of FIG. 19 may be created.

Learning data or training data TRD may be generated through a testing process of multiple nonvolatile memory devices. The training data TRD correspond to a combination of the exposure time ETm, the retention value VL, and the exposure temperature ETp. A plurality of training data TRD corresponding to different combinations may be generated through tests according to different exposure times ETm and exposure temperatures ETp.

In this case, the input data X of the deep learning model DLM may include at least the exposure time ETm and the retention value VL. The output data Y may include at least the estimated exposure temperature or the measured exposure temperature ETp. Supervised learning of the deep learning model DLM may be performed using the exposure temperature ETp of the training data TRD as the ground truth of the estimated exposure temperature ETp.

FIG. 25 is a diagram illustrating data in a method of providing an exposure temperature of a nonvolatile memory device in a power-off state according to some implementations.

Referring to FIG. 25, the input data X of the deep learning model may include not only the exposure time ETm and the retention value VL, but also various exposure conditions that affect the deterioration of retention characteristics, such as program-erase cycle P/E, erase-program interval EPI, temperature Ton at the time point of power-on, temperature Toff at the time point of power-off, usage time UT of the nonvolatile memory device, and/or the like.

In some implementations, when the exposure condition further includes the program-erase cycle P/E of the target memory cells of the nonvolatile memory device, the training data TRD of FIG. 24 may further include the program-erase cycle P/E, and the program-erase cycle P/E may be added as the input to the deep learning model DLM. In this case, the exposure temperature monitor ETM as described above may estimate the measured exposure temperature ETp corresponding to the measured exposure time ETm, the measured retention value VL and the current program-erase cycle P/E for the target memory cells based on the reference information RFI, for example, using the deep learning model DLM.

The output data Y of the deep learning model DML may further include the reliability value RB of the estimated exposure temperature ETp as well as the exposure temperature ETp, as shown in FIG. 25. The deep learning model DLM may be trained to output the exposure temperature ETp and the reliability value RB. The reliability value RB may represent uncertainty in the estimated exposure temperature ETp due to lack of training data or uncertainty due to noise in the training data.

Figure 26:
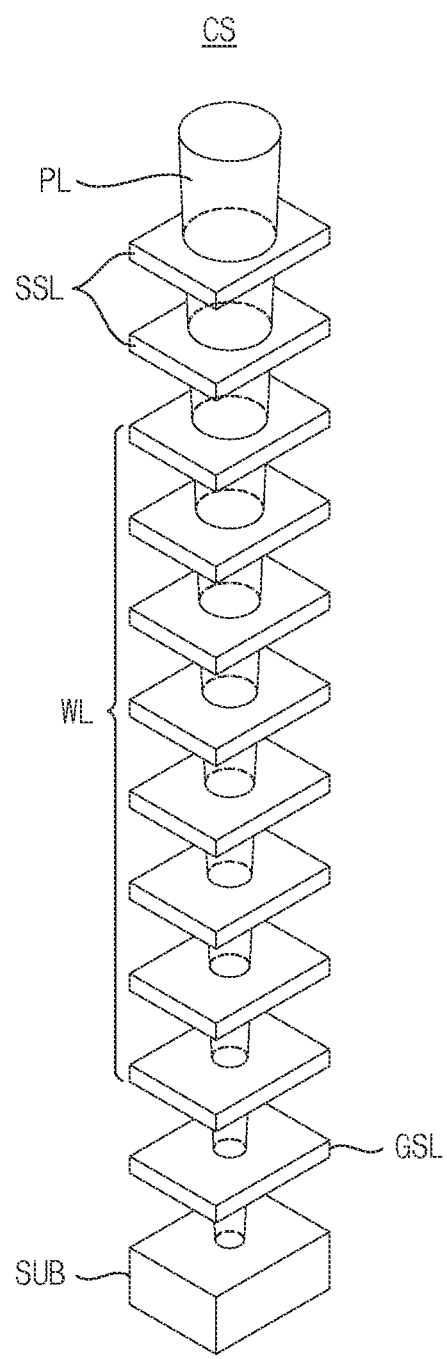
FIG. 26 is a diagram illustrating an example structure of a cell string included in a nonvolatile memory device according to some implementations.

FIG. 26 is a diagram illustrating an example structure of a cell string included in a nonvolatile memory device according to some implementations.

Referring to FIG. 26, to form a cell string CS, a pillar PL extending in a direction perpendicular to the surface of substrate SUB and contacting the substrate SUB may be provided on the substrate SUB. The ground selection line GSL, wordlines WL, and string selection lines SSL may be formed of conductive materials parallel to the substrate SUB, for example, metal materials. The pillar PL may contact the substrate SUB by passing through conductive materials forming the ground selection line GSL, the wordlines WL, and the string selection lines SSL. Also, the wordlines WL may include dummy wordlines not used for data storage. A dummy wordline may be used for a variety of purposes.

For example, in the manufacturing process of the cell string CS, the width of the pillar PL or the cross-sectional area parallel to the upper surface of the substrate SUB may be formed smaller as the distance to the substrate SUB decreases. Therefore, when the same voltage is applied to the bodies of the ground selectin transistor GST, the memory cells MCs, and the string select transistors SSTs, the electric field formed in the memory cell adjacent to the substrate SUB or the ground selection transistor GST may be greater than the electric field formed in the memory cell or string select transistor SST far from the substrate SUB. These characteristics affect the retention characteristic of the memory cells. The width of the pillar PL or the cross-sectional area parallel to the upper surface of the substrate SUB is not limited to the example of FIG. 26. The width of the pillar PL or the cross-sectional area parallel to the upper surface of the substrate SUB may be formed differently according to the distance from the substrate SUB depending on the etching process.

Figure 27:
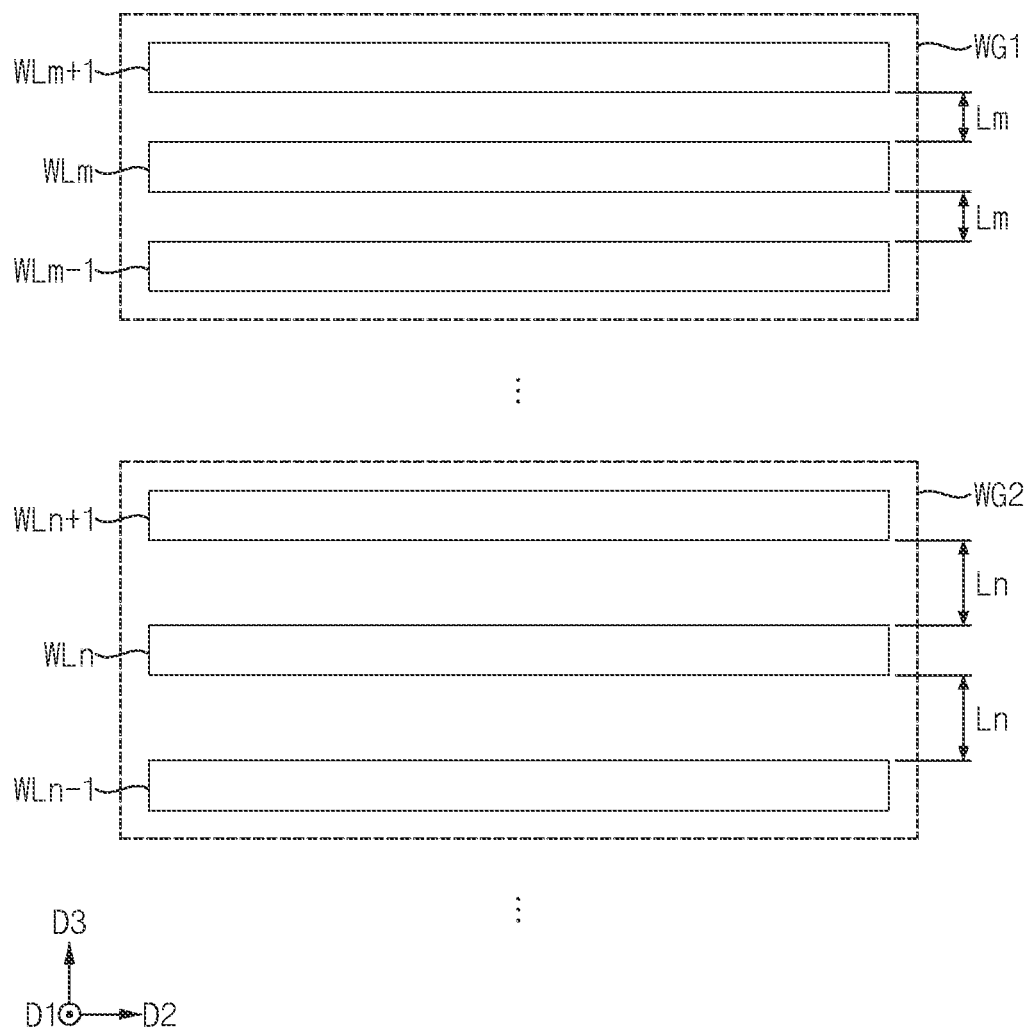
FIG. 27 is a diagram illustrating an example of an example of wordline groups in a nonvolatile memory device according to some implementations.

FIG. 27 is a diagram illustrating an example of an example of wordline groups in a nonvolatile memory device according to some implementations.

In a nonvolatile memory device, intervals between adjacent wordlines may be differently set according to heights in the vertical direction D3 according to limitations of a manufacturing process, relationships with peripheral components, and the like. As the wordline spacing decreases, disturbance between adjacent memory cells may increase and retention characteristics may deteriorate.

In some implementations, the test memory cells for generating the reference information RFI and the target memory cells for estimating the exposure temperature may be set based on the word line spacing.

Referring to FIG. 27, spacing Lm of word lines VLm+1, WLm and WLm−1 belonging to a first group WG1 is relatively small, and spacing Ln of word lines WLn+1, WLn and WLn−1 belonging to a second group WG2 is relatively large. In this case, the first group WG1 has deteriorated retention characteristics and is more affected by the exposure temperature than the second group WG2. The memory cells connected to the word lines VLm+1, WLm and WLm−1 of the first group WG1 may be set as the test memory cells and the target memory cells described above.

Hereinafter, some implementations of setting monitoring data written to the test memory cells for generating reference information RFI and the target memory cells for estimating the exposure temperature will be described with reference to FIGS. 28 to 30B. The descriptions overlapping with FIG. 3 may be omitted.

FIGS. 28 through 30B are diagrams illustrating some implementations of a monitoring program operation in a method of providing (e.g., determining) an exposure temperature of a nonvolatile memory device in a power-off state according to some implementations.

Figure 28:
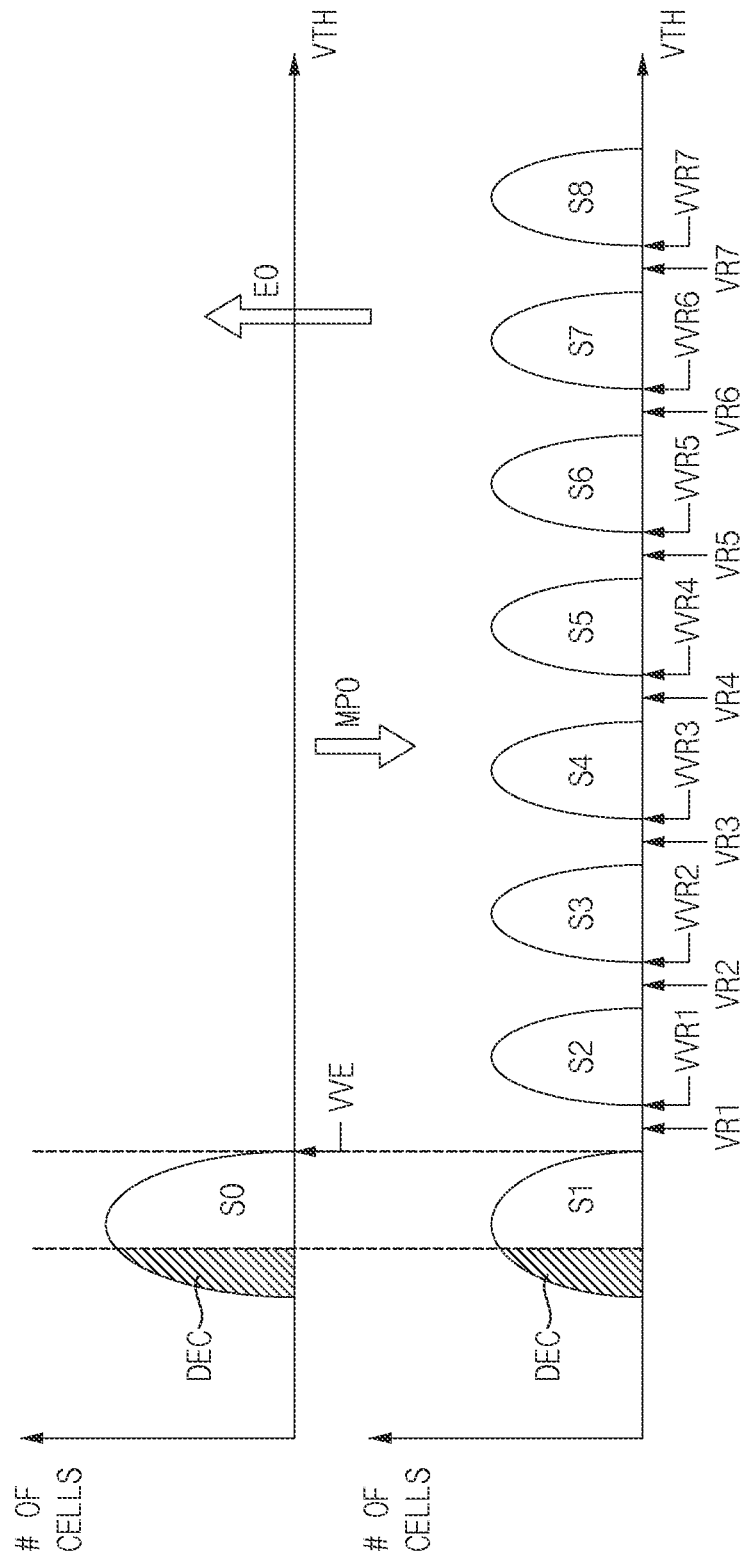
FIGS. 28 through 30B are diagrams illustrating some implementations of a monitoring program operation in a method of providing an exposure temperature of a nonvolatile memory device in a power-off state according to some implementations.

Referring to FIG. 28, monitoring data may be set such that the numbers of the states S1~S8 of the target memory cells may be uniform. At this time, a randomizing scheme may be used to equalize the numbers of the states S1~S8.

In normal program operations for writing data to a nonvolatile memory device, it is required to minimize degradation of retention characteristics. Therefore, the deterioration of retention characteristics may be reduced through the pre-program operation PPO as described with reference to FIG. 3. On the other hand, in the monitoring program operation MPO for estimating exposure temperature according to some implementations, the pre-program operation PPO may be omitted as shown in FIG. 28. Deterioration of the retention characteristics of target memory cells according to the exposure temperature may be accelerated by the remaining over-erased memory cells DEC, and the accuracy of exposure temperature measurement may be improved.

Figure 29B:
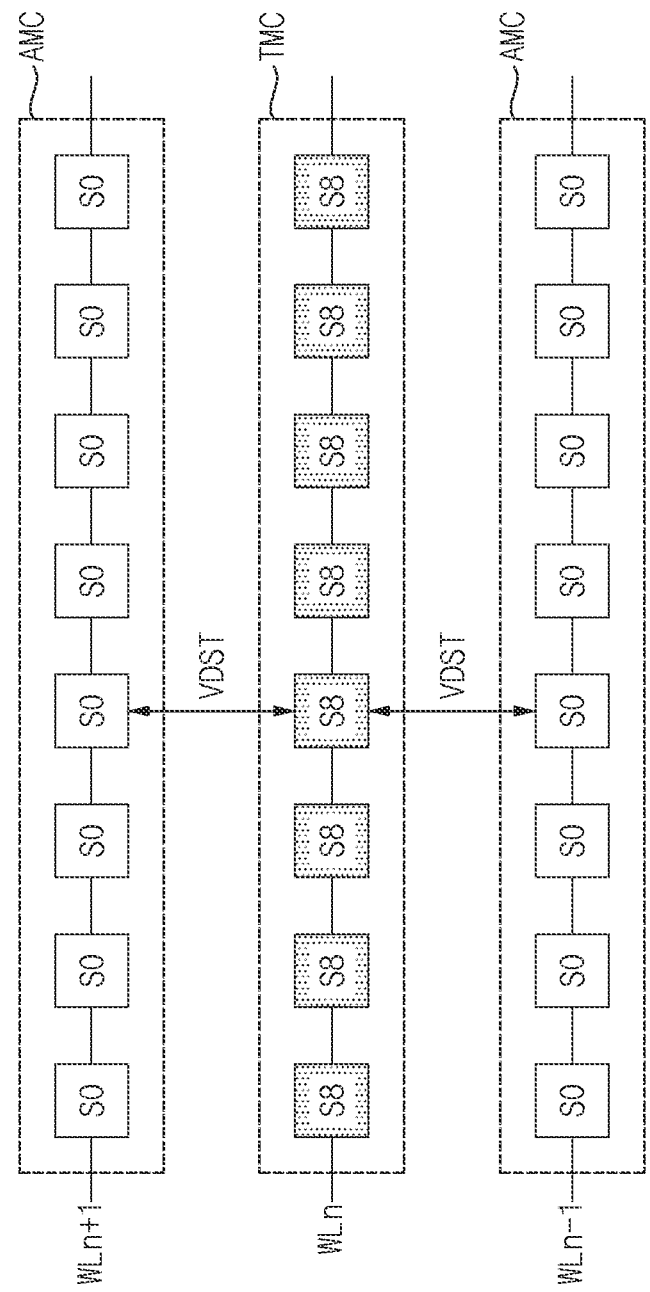

Referring to FIGS. 29A and 29B, the monitoring data may be set such that all target memory cells are programmed to a program state with the highest threshold voltage distribution. In other words, the monitoring data may be set such that the target memory cells are in the eighth state S8 and the monitoring program operation MPO may be performed based on such monitoring data. As described with reference to FIGS. 12A and 12B, since the eighth state S8 has the greatest deterioration in retention characteristics depending on the exposure temperature, the deterioration of retention characteristics may be accelerated and the accuracy of exposure temperature measurement may be improved.

In some implementations, as shown in FIG. 29B, the aggressor memory cells AMC adjacent to the target memory cells TMC may be set, and the aggressor memory cells AMC may be maintained in the erase state S0 during the power-off state. For example, when the memory cells connected to the word line WLn are set as the target memory cells TMC, the memory cells connected to the word lines WLn+1 and WLn−1 adjacent above and below may be set to the aggressor memory cells AMC. In this case, the vertical disturbance VDST affecting on the target memory cells TMC by the aggressor memory cells AMC may be increased to promote the deterioration of the retention characteristics of the target memory cells TMC according to the exposure temperature and the accuracy of the exposure temperature measurement may be improved.

Figure 30A:
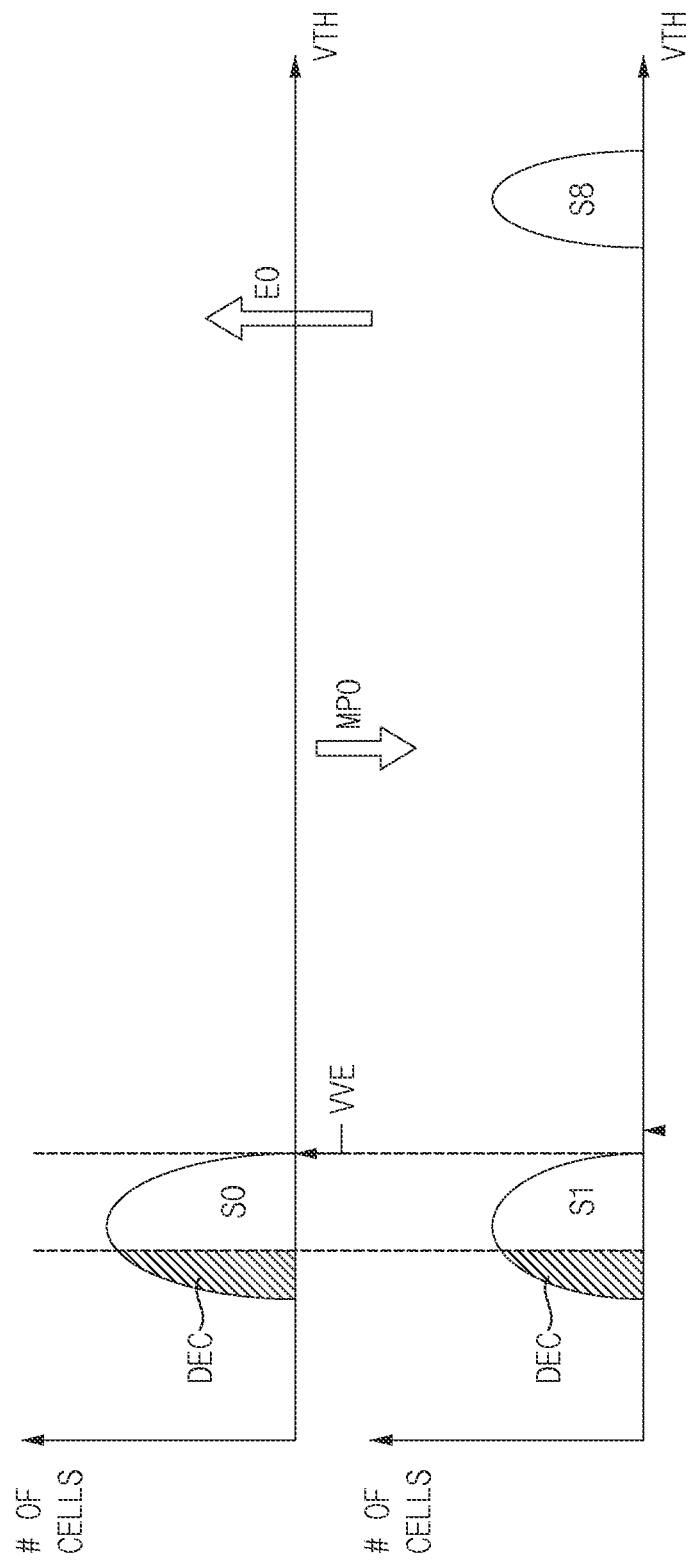
Figure 30B:
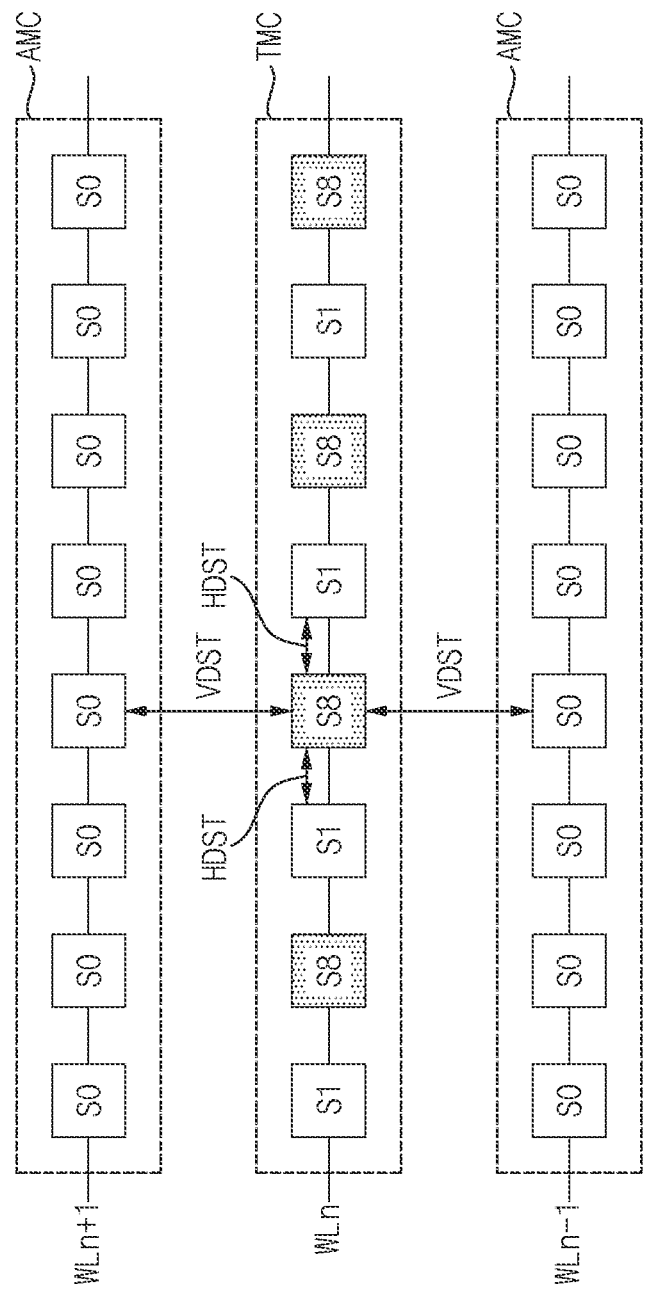

Referring to FIGS. 30A and 30B, the monitoring data may be set such that the target memory cells are programmed to an erase state or a program state with the highest threshold voltage distribution. In other words, the monitoring data may be set such that the target memory cells are in the eighth state S8 or the first state S1 corresponding to the unprogrammed erase state S0. For example, as shown in FIG. 30B, the monitoring data may be set such that the first state S1 and the eighth state S8 may be alternately arranged and the monitoring program operation MPO may be performed based on such monitoring data. In this case, not only the vertical disturbance VDST affecting on the target memory cells TMC of the eighth state S8 by the aggressor memory cells AMC, but also the lateral disturbance or the horizontal disturbance HDST between the target memory cells TMC of the first state S1 and the eighth state S8 may be increased to further promote the deterioration of the retention characteristics of the target memory cells TMC according to the exposure temperature and the accuracy of the exposure temperature measurement may be improved.

FIGS. 29B and 30B illustrate, for convenience of illustration and description, that memory cells connected to one word line WLn are set as the target memory cells TMC, and memory cells connected to two adjacent word lines WLn+1 and WLn−1 are set as the aggressor memory cells AMC, but some implementations are not limited thereto. According to some implementations, the number of wordlines corresponding to target memory cells TMC and/or aggressor memory cells (AMC) may be determined in various ways. Additionally, according to some implementations, to reduce the deviation of the exposure temperature estimation and increase accuracy, the memory cells connected to a plurality of wordlines arranged at different physical locations may be set as the target memory cells TMC.

In some implementations, the memory cells included in a defective memory block of a nonvolatile memory device may be set as the target memory cells TMC. Even if a memory block is determined to be a bad block, memory cells connected to some wordlines of the bad block may operate normally. In this way, the bad blocks may be used to set the target memory cells TMC for estimating the exposure temperature without causing a decrease in available memory capacity.

FIGS. 28 through 30B illustrate some implementations of the monitoring data of a specific pattern, but implementations are not limited thereto. According to some implementations, the monitoring data may vary depending on the power-off time point. In some implementations, the monitoring data may be metadata backed up to the nonvolatile memory device before the nonvolatile memory device is powered off. As described above with reference to FIG. 1, a journaling technique may be used to maintain consistency of firmware metadata FMDT and the nonvolatile metadata NVMDT. When the nonvolatile memory device is powered off, a backup program operation is performed to store the firmware metadata FMDT in the nonvolatile memory device or update the nonvolatile metadata NVMDT based on the firmware metadata FMDT. In this way, a separate monitoring program operation may be omitted by using, as the monitoring data, the metadata that is essentially backed up in the nonvolatile memory device when the power is turned off.

Meanwhile, in the case of variable monitoring data, the address of the monitoring data and the initial retention value of the monitoring data have to be stored in the nonvolatile memory device when the power is turned off. Thereafter, when the nonvolatile memory device is powered on, the exposure temperature may be estimated based on the ratio of the measured retention value to the stored initial retention value. In this case, the reference information RFI may include the ratio of the count value after exposure to the initial count value instead of the count value or number CNT, dCNT and NEB of FIG. 13.

Figure 31:
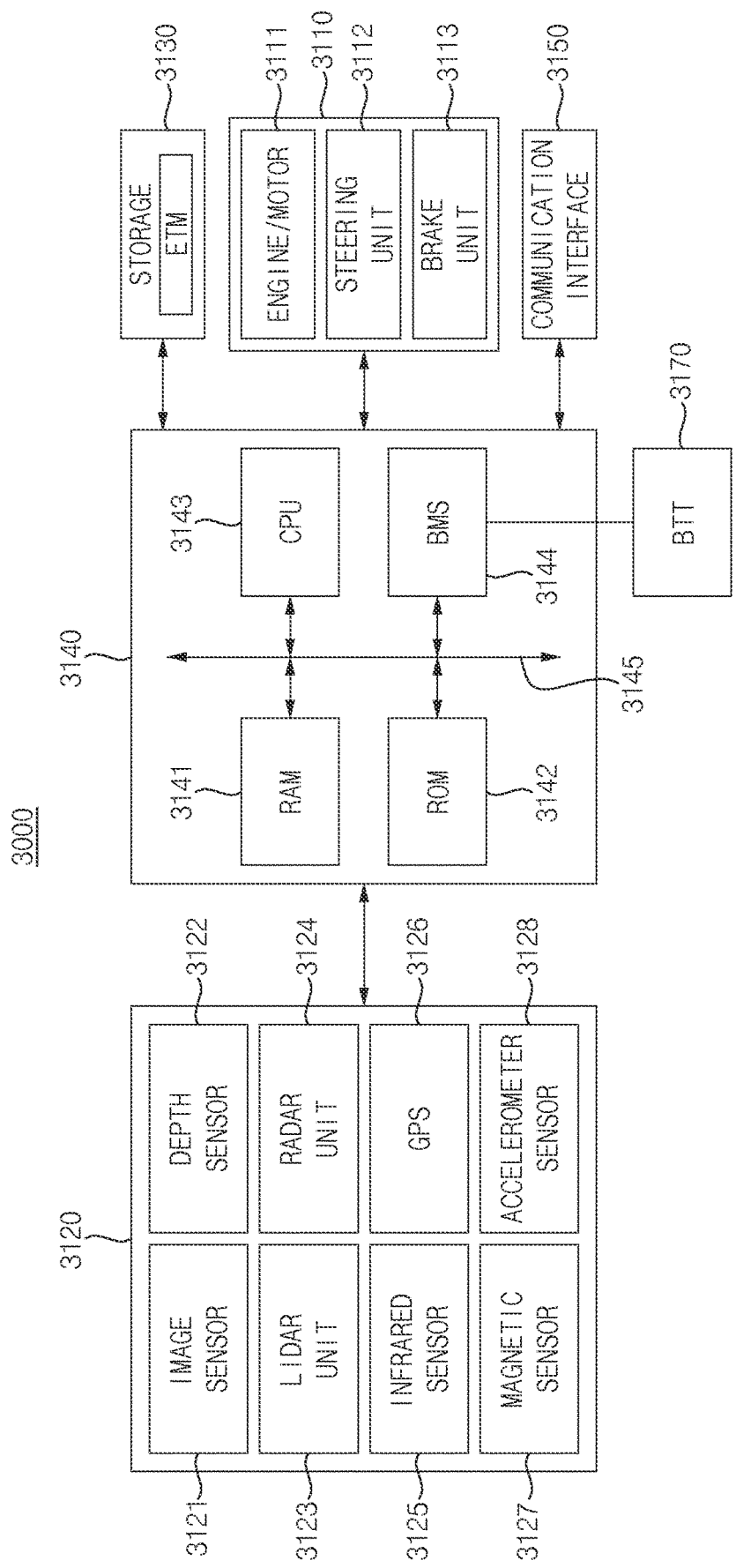
FIG. 31 is a block diagram illustrating an autonomous driving device including a nonvolatile memory device according to some implementations.

FIG. 31 is a block diagram illustrating an autonomous driving device including a nonvolatile memory device according to some implementations.

Referring to FIG. 31, an autonomous driving device 3000 may include a driver (e.g., including circuitry) 3110, a sensor 3120, a storage 3130, a controller (e.g., including processing circuitry) 3140, and a communication interface 3150.

The driver 3110 may, for example, be a configuration for driving the autonomous driving device 3000 and may include various circuitry. In a case that the autonomous driving device 3000 is implemented as a vehicle, the driver 3110 may include various circuitry and/or components, such as, for example, an engine/motor 3111, a steering unit 3112, a brake unit 3113 and the like.

The engine/motor 3111 may include any combination of an internal combustion engine, an electric motor, a steam locomotive, and a stirling engine. For example, in a case that the autonomous driving device 3000 is a gas-electric hybrid car, the engine/motor 3111 may be a gasoline engine and an electric motor. For example, the engine/motor 3111 may be configured to supply energy for the autonomous driving device 3000 to drive on a predetermined driving route.

The steering unit 3112 may be any combination of mechanisms included to control a direction of the autonomous driving device 3000. For example, when an obstacle is recognized while the autonomous driving device 3000 is driving, the steering unit 3112 may change the direction of the autonomous driving device 3000. In a case that the autonomous driving device 3000 is a vehicle, the steering unit 3112 may be configured to turn the steering wheel clockwise or counterclockwise, and change the direction of the autonomous driving device 3000 accordingly.

The brake unit 3113 may be any combination of mechanisms included to decelerate the autonomous driving device 3000. For example, the brake unit may use friction to reduce a speed of wheels/tires. When an obstacle is recognized while the autonomous driving device 3000 is driving, the brake unit 3113 may be configured to decelerate or slow the autonomous driving device 3000.

The driver 3110 may be an autonomous driving device 3000 driving or traveling on the ground, but implementations are not limited thereto. The driver 3110 may include a flight propulsion unit, a propeller, wings, etc. and may include a variety of vessel propulsion devices.

The sensor 3120 may include a number of sensors configured to sense information relating to a surrounding environment of the autonomous driving device 3000. For example, the sensor 3120 may include at least one of an image sensor 3121, a depth camera 3122, a LIDAR unit 3123, a RADAR unit 3124, an infrared sensor 3125, a Global Positioning System (GPS) 3126, a magnetic sensor 3127, and/or an accelerometer sensor 3128.

The image sensor 3121 may be configured to capture an image of or other data related to an external object located outside of the autonomous driving device 3000. The captured image or other data related to the external device may be used as data for changing at least one of a velocity and direction of the autonomous driving device 3000. The image sensor 3121 may include a sensor of various types, such as a charge coupled device (CCD) and a complementary metal oxide semiconductor (CMOS). In addition, the depth camera 3122 may acquire a depth for determining a distance between the autonomous driving device 3000 and an external object.

The LIDAR unit 3123, the RADAR unit 3124, and the infrared sensor 3125 may each include a sensor configured to output a particular signal and sense external objects in an environment in which the autonomous driving device 3000 is located. For example, the LIDAR unit 3123 may include a laser light source and/or laser scanner configured to radiate a laser, and a detector configured to detect reflection of the laser. The RADAR unit 3124 may be a sensor configured to sense objects in the environment in which the autonomous driving device 3000 is located, using a wireless signal. In addition, the RADAR unit 3124 may be configured to sense speeds and/or directions of the objects. The infrared sensor 3125 may be a sensor configured to sense external objects in an environment in which the autonomous driving device 3000 is located using a light of a wavelength of an infrared area.

The GPS 3126, the magnetic sensor 3127, and the accelerometer sensor 3128 may each include a sensor configured to acquire information relating to a velocity, direction, location, etc. of the autonomous driving device 3000. For example, information relating to a current state of the autonomous driving device 3000 may be acquired and a possibility of collision with an external object, etc. may be identified and/or estimated. The GPS 3126 may be configured to receive a location of the autonomous driving device 3000 as a latitude and altitude data through a satellite, and the magnetic sensor 3127 and the accelerometer sensor 3128 may be configured to identify the current state of the autonomous driving device 3000 according to momentum of the autonomous driving device 3000.

The storage 3130 may be configured to store data necessary for the controller 3140 to execute various processing. For example, the storage 3130 may be realized as an internal memory such as ROM, RAM and the like included in the controller 3140, and may be realized as a separate memory from the controller 3140. In this case, the storage 3130 may be realized in the form of a memory embedded in the autonomous driving device 3000, or may be realized in the form of a memory that may be detachable from the autonomous driving device 3000 according to the usage of data storage. For example, data for driving the autonomous driving device 3000 is stored in a memory embedded in the autonomous driving device 3000, and data for an extension function of the autonomous driving device 3000 may be stored in a memory that may be detached from the autonomous driving device 3000. The memory embedded in the autonomous driving device 3000 may be realized in the form of a nonvolatile memory, volatile memory, flash memory, hard disk drive (HDD), solid state drive (SDD), or the like, and the memory that may be detached from the autonomous driving device 3000 may be realized in the form of a memory card (e.g., micro SD card, USB memory), an external memory that is connectable to a USB port (e.g. USB memory), and the like.

The communication interface 3150 may include various communication circuitry and may be configured to facilitate communication between the autonomous driving device 3000 and an external device. For example, the communication interface 3150 may transmit and receive driving information of the autonomous driving device 3000 to and from the external device. For example, the communication interface 3150 may be configured to perform communication through various communication methods such as an Infrared (IR) communication, a Wireless Fidelity (WI-FI), Bluetooth, Zigbee, Beacon, near field communication (NFC), WAN, Ethernet, IEEE 1394, HDMI, USB, MHL, AES/EBU, Optical, Coaxial, and the like. In some implementations, the communication interface 3150 may be configured to communicate driving information through a server (not illustrated).

The controller 3140 may include a random access memory (RAM) 3141, a read only memory (ROM) 3142, a central processing unit (CPU) 3143, a battery management system (BMS) 3144 and a bus 3145. The RAM 3141, the ROM 3142, the CPU 143 and the BMS 3144 may be connected to each other through the bus 3155. The controller 3140 may be implemented as a system on chip (SoC).

The RAM 3141 may be a memory for reading, from the storage 3130, various instructions, etc. related to driving of the autonomous driving device 3000. The ROM 3142 may store a set of instructions for system booting. In response to a turn on command being input to the autonomous driving device 3000 and power being supplied, the CPU 3143 may copy an O/S stored in the storage 3130 into the RAM 3141 according to a command stored in the ROM 3142, and boot the system by executing the 0/S. If booting is completed, the CPU 3143 performs various operations by copying various types of application programs stored in the storage 3130 into the RAM 3141 and executing the application programs copied into the RAM 3141. The controller 3140 may perform various operations using a module stored in the storage 3130.

According to some implementations, the storage device 3130 may include an exposure temperature monitor ETM for performing the method of providing the exposure temperature of the nonvolatile memory device in the power-off state as described above. The exposure temperature monitor ETM may provide the measured exposure temperature to the controller 3140 when the storage device 3130 is powered on. According to some implementations, the measured exposure temperature may be provided directly to the battery management system 3144 configured to manage the battery BTT through the peripheral management controller SMC as described with reference to FIG. 1.

As described above, the storage device and the method of providing an exposure temperature according to some implementations may reduce the power consumption and enhance the performance of the battery by providing the exposure information in the power-off state using the retention characteristic of the nonvolatile memory device without supplying power to circuits for temperature monitoring in the power-off state. By using the exposure temperature in the power-off state, products containing temperature-vulnerable components may be efficiently managed and controlled.

Aspects of this disclosure may be applied to any electronic devices and systems including a nonvolatile memory device. For example, the described processes, devices, and systems may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

The foregoing is illustrative of some implementations and is not to be construed as limiting thereof. Although a few some implementations have been described, those skilled in the art will readily appreciate that many modifications are possible in the some implementations without materially departing from the scope of this disclosure.

What is claimed is:

1. A method comprising:
    obtaining reference information indicating relationships between an exposure condition and a retention value, wherein the exposure condition includes an exposure temperature and an exposure time of a nonvolatile memory device, and wherein the retention value indicates a retention characteristic of the nonvolatile memory device;
    before a power-off time point at which the nonvolatile memory device is powered off, writing monitoring data in target memory cells included in the nonvolatile memory device;
    after a power-on time point at which the nonvolatile memory device is powered on, generating a measured retention value based on data from the target memory cells, wherein generating the measured retention value comprises:
        applying a monitoring voltage to a wordline connected to the target memory cells to obtain a count value indicating a number of the target memory cells having threshold voltages higher than the monitoring voltage, and
        determining the measured retention value based on the count value; and
    determining, based on the reference information, the measured retention value, and an exposure time between the power-off time point and the power-on time point, a temperature to which the nonvolatile memory device was exposed while powered off.

2. The method of claim 1, wherein the measured retention value comprises the count value.

3. The method of claim 1, wherein the count value is a first count value, and wherein generating the measured retention value further comprises:
    applying a second monitoring voltage to the wordline connected to the target memory cells to obtain a second count value indicating a number of the target memory cells having threshold voltages higher than the second monitoring voltage, wherein the measured retention value comprises a difference between the first count value and the second count value.

4. The method of claim 1, comprising:
setting memory cells included in a defective memory block of the nonvolatile memory device as the target memory cells.

5. The method of claim 1, wherein the monitoring data comprises metadata that is backed up in the nonvolatile memory device before the nonvolatile memory device is powered off.

6. The method of claim 1, wherein the exposure condition includes a program-erase cycle of the target memory cells, and wherein determining the temperature to which the nonvolatile memory device was exposed is based further on the program-erase cycle of the target memory cells.

7. The method of claim 1, comprising generating the reference information, wherein generating the reference information comprises:
writing the monitoring data in test memory cells included in a test nonvolatile memory device;
exposing the test nonvolatile memory device to a test condition in a test environment, the test condition including a test temperature and a test time; and
after the test nonvolatile memory device is exposed to the test condition in the test environment, generating a retention value corresponding to the test condition based on data from the test memory cells.

8. The method of claim 7, wherein a physical location of the test memory cells in the test nonvolatile memory device matches a physical location of the target memory cells in the nonvolatile memory device.

9. The method of claim 7, wherein an operating condition of writing the monitoring data in the test memory cells matches an operating condition of writing the monitoring data in the target memory cells, and wherein an operating condition of generating the retention value corresponding to the test condition matches an operating condition of generating the measured retention value.

10. The method of claim 1, wherein the reference information comprises a reference table including multiple combinations of the exposure time, the retention value, and the exposure temperature.

11. The method of claim 1, wherein the reference information comprises a function having inputs comprising the exposure time and the retention value and an output comprising the exposure temperature.

12. The method of claim 1, wherein the reference information comprises an artificial neural network having inputs comprising the exposure time and the retention value and an output comprising the exposure temperature.

13. The method of claim 12, comprising generating the reference information, wherein generating the reference information comprises:
generating training data including multiple combinations of the exposure time, the retention value, and the exposure temperature; and
training the artificial neural network based on the training data.

14. The method of claim 1, comprising:
setting the monitoring data such that writing the monitoring data in the target memory cells programs the target memory cells to a state corresponding to a highest threshold voltage distribution.

15. The method of claim 1, comprising:
setting aggressor memory cells adjacent to the target memory cells; and
maintaining the aggressor memory cells in an erased state.

16. A storage device comprising:
a nonvolatile memory device configured to store reference information indicating relationships between an exposure condition and a retention value, wherein the exposure condition includes an exposure temperature and exposure time of the nonvolatile memory device, and wherein the retention value indicates a retention characteristic of the nonvolatile memory device; and
a storage controller configured to:
before a power-off time point at which the nonvolatile memory device is powered off, write monitoring data in target memory cells included in the nonvolatile memory device, wherein writing the monitoring data in the target memory cells programs the target memory cells to a state corresponding to a highest threshold voltage distribution;
after a power-on time point at which the nonvolatile memory device is powered on, generate a measured retention value based on data from the target memory cells; and
determine, based on the reference information, the measured retention value, and an exposure time between the power-off time point and the power-on time point, a temperature to which the nonvolatile memory device was exposed while powered off.

17. The storage device of claim 16, wherein the nonvolatile memory device is a three-dimensional NAND flash memory device in which memory cells are stacked in a vertical direction.

18. The storage device of claim 16, wherein generating the measured retention value comprises:
generating read data corresponding to at least a portion of the monitoring data by reading from the target memory cells;
determining an error bit number characterizing the read data; and
providing the error bit number as the measured retention value.

19. The storage device of claim 18, wherein a plurality of data bits are written in the target memory cells, and wherein the read data corresponds to page data corresponding to a most significant bit of the plurality of data bits.

20. A method comprising:
writing first monitoring data in test memory cells included in a test nonvolatile memory device;
exposing the test nonvolatile memory device to a test condition in a test environment, the test condition comprising a test temperature and a test time;
after the test nonvolatile memory device is exposed to the test condition, generating a retention value corresponding to the test condition based on data from the test memory cells;
generating reference information based on the test time, the retention value, and the test temperature;
before a power-off time point at which a nonvolatile memory device is powered off, writing second monitoring data in target memory cells included in the nonvolatile memory device, wherein an operating condition of writing the first monitoring data in the test memory cells matches an operating condition of writing the second monitoring data in the target memory cells;
after a power-on time point at which the nonvolatile memory device is powered on, generating a measured retention value based on data from the target memory cells, wherein an operating condition of generating the retention value corresponding to the test condition matches an operating condition of generating the measured retention value, wherein the measured retention value comprises at least one of
- a number of the target memory cells having threshold voltages higher than a monitoring voltage,
- a number of the target memory cells having threshold voltages between a first monitoring voltage and a second monitoring voltage, or
- an error bit number of the data from the target memory cells; and determining, based on the reference information, the measured retention value, and an exposure time between the power-off time point and the power-on time point, a temperature to which the nonvolatile memory device was exposed while powered off.

* * * * *